US009360671B1

(12) United States Patent
Zhou

(10) Patent No.: US 9,360,671 B1
(45) Date of Patent: Jun. 7, 2016

(54) SYSTEMS AND METHODS FOR IMAGE ZOOM

(71) Applicant: Google Inc., Mountain View, CA (US)

(72) Inventor: Changyin Zhou, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/299,304

(22) Filed: Jun. 9, 2014

(51) Int. Cl.
*H04N 5/232* (2006.01)
*G06T 3/40* (2006.01)
*G02B 27/01* (2006.01)
*G06F 3/00* (2006.01)
*H04N 21/2187* (2011.01)

(52) U.S. Cl.
CPC .............. *G02B 27/017* (2013.01); *G06F 3/005* (2013.01); *G06T 3/40* (2013.01); *H04N 5/23216* (2013.01); *H04N 5/23296* (2013.01); *H04N 21/2187* (2013.01); *G02B 2027/0178* (2013.01); *H04N 5/232* (2013.01)

(58) Field of Classification Search
None
See application file for complete search history.

(56) References Cited

U.S. PATENT DOCUMENTS

| 6,249,616 | B1 * | 6/2001 | Hashimoto | G06T 7/0034 345/427 |
| 6,728,317 | B1 * | 4/2004 | Demos | H04N 5/14 348/E5.108 |
| 8,134,589 | B2 | 3/2012 | Border et al. | |
| 8,553,106 | B2 * | 10/2013 | Scarff | H04N 5/2258 348/240.2 |
| 2006/0148537 | A1 * | 7/2006 | Perez | H04B 15/00 455/575.1 |
| 2006/0175549 | A1 * | 8/2006 | Miller | G08B 13/19643 250/334 |
| 2008/0030592 | A1 | 2/2008 | Border et al. | |
| 2010/0238327 | A1 * | 9/2010 | Griffith | H04N 5/2251 348/240.99 |
| 2010/0245532 | A1 * | 9/2010 | Kurtz | G06K 9/00711 348/14.03 |
| 2011/0058036 | A1 * | 3/2011 | Metzger | H04N 7/181 348/143 |
| 2012/0074227 | A1 * | 3/2012 | Ferren | G02B 13/0065 235/462.21 |

(Continued)

FOREIGN PATENT DOCUMENTS

WO    2010147609 A1    12/2010

OTHER PUBLICATIONS

Low, Aloysius, "Corephotonics' dual-camera tech will change smartphone imaging—The Israeli startup's camera technology will let smartphones do actual optical zoom without the need for moving parts." http://www.cnet.com/news/corephotonics-dual-camera-tech-will-change-smartphone-imaging/.

*Primary Examiner* — Dismery Mercedes
(74) *Attorney, Agent, or Firm* — McDonnell Boehnen Hulbert & Berghoff LLP

(57) ABSTRACT

A method is provided that includes operating a first camera to capture a first image stream and operating a second camera to capture a second image stream. The method further includes initially using the first image stream to display a first field of view in a live-view interface of a graphic display and, while displaying the first image stream in the live-view interface, receiving an input corresponding to a zoom command. The method further includes, in response to receiving the input: (a) switching from using the first image stream to display the first field of view in the live-view interface to using a combination of the first image stream and the second stream to display a transitional field of view of the environment in the live-view interface and (b) subsequently switching to using the second image stream to display the second field of view in the live-view interface.

20 Claims, 34 Drawing Sheets

(56) References Cited

U.S. PATENT DOCUMENTS

| | | | |
|---|---|---|---|
| 2012/0075489 A1 | 3/2012 | Nishihara | |
| 2013/0141525 A1* | 6/2013 | Williams | H04N 7/00 348/38 |
| 2013/0265311 A1* | 10/2013 | Na | G06T 3/40 345/428 |
| 2014/0160231 A1* | 6/2014 | Middleton | H04N 5/23238 348/36 |
| 2014/0204245 A1* | 7/2014 | Wexler | H04N 5/23222 348/231.99 |
| 2014/0247979 A1* | 9/2014 | Roffet | H04N 5/235 382/163 |
| 2015/0215516 A1* | 7/2015 | Dolgin | H04N 5/23212 348/169 |

* cited by examiner

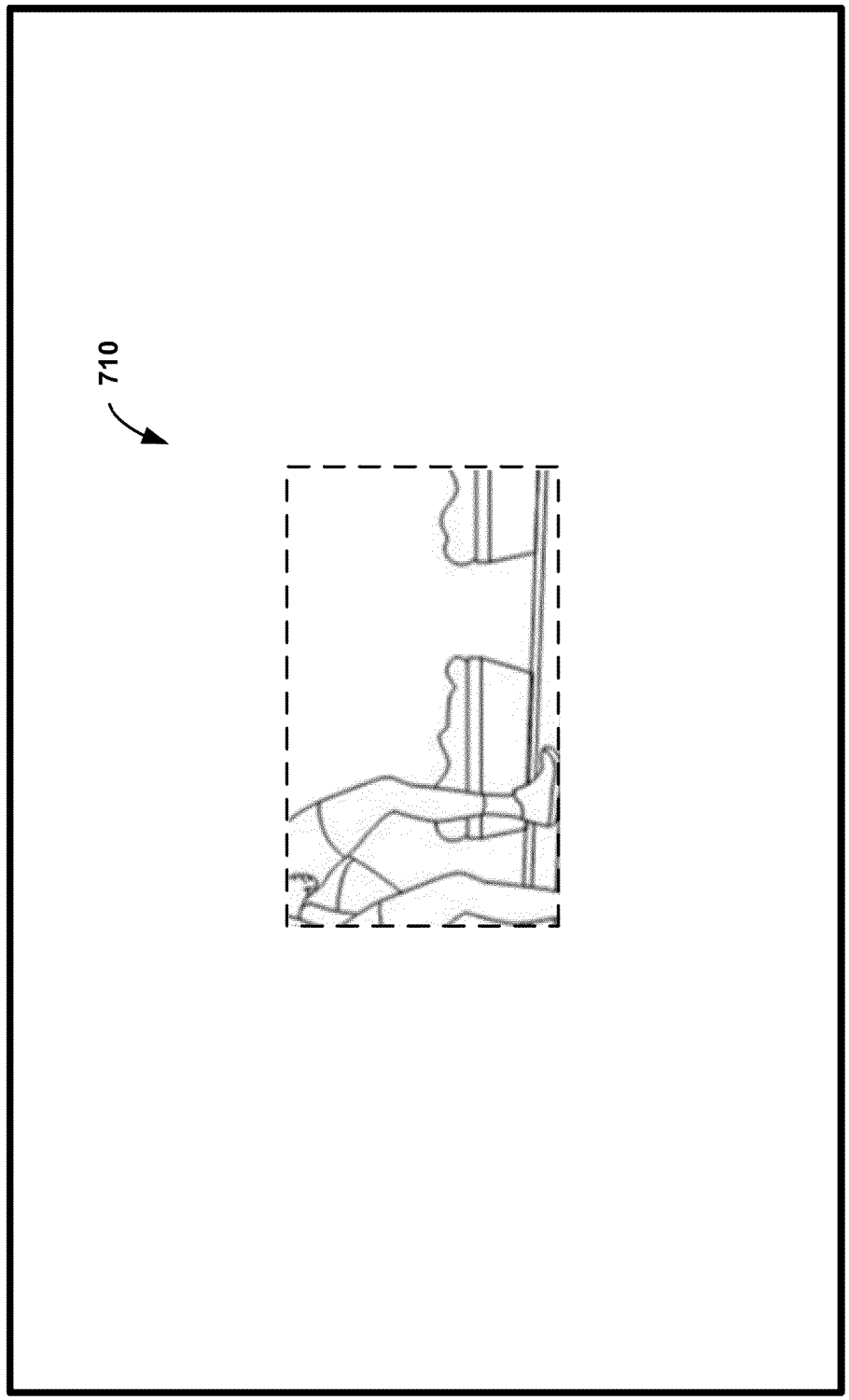

SYSTEMS AND METHODS FOR IMAGE ZOOM

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a graphic display close enough to a wearer's (or user's) eye(s) such that the displayed image appears as a normal-sized image, such as might be displayed on a traditional image display device. The relevant technology may be referred to as "near-eye displays."

Wearable computing devices with near-eye displays may also be referred to as "head-mountable displays" (HMDs), "head-mounted displays," "head-mounted devices," or "head-mountable devices." A head-mountable display places a graphic display or displays close to one or both eyes of a wearer. To generate the images on a display, a computer processing system may be used. Such displays may occupy a wearer's entire field of view, or only occupy part of wearer's field of view. Further, head-mounted displays may vary in size, taking a smaller form such as a glasses-style display or a larger form such as a helmet, for example.

Emerging and anticipated uses of wearable displays include applications in which users interact in real time with an augmented or virtual reality. Such applications can be mission-critical or safety-critical, such as in a public safety or aviation setting. The applications can also be recreational, such as interactive gaming. Many other applications are also possible.

SUMMARY

This disclosure includes methods and systems for image zoom. An imaging system may include a first camera having a wide field of view of an environment and a second camera having a narrow field of view of the environment. The cameras may continuously capture image streams representing the first and second fields of view. The imaging system may include a live-view interface configured to display image frames of the first or second image streams (or representations thereof). In one example, the imaging system may initially be displaying a first image stream representing the wide field of view. The imaging system may then receive an input indicating that the real-time display should transition from displaying the wide-angle first image stream to displaying the narrow-angle second image stream. Before displaying the second image stream, the imaging system may display one or more composite image frames (e.g. a transitional field of view) representing visual information from both the first and second image streams. The display of the composite image frames may yield a perceived effect of substantially continuous zoom between the wide field of view first image stream and the narrow field of view second image stream respectively captured by the first and second cameras.

An example method may include operating a first camera having a first field of view of an environment, to capture a first image stream representing the first field of view and operating a second camera having a second field of view of the environment, to capture a second image stream representing the second field of view. The first field of view may be wider than the second field of view. The method further includes initially using the first image stream to display the first field of view in a live-view interface of a graphic display and, while displaying the first image stream in the live-view interface, receiving an input corresponding to a zoom command. The method may further include, in response to receiving the input, (a) switching from using the first image stream to display the first field of view in the live-view interface to using a combination of the first image stream and the second stream to display a transitional field of view of the environment in the live-view interface, and (b) subsequently switching to using the second image stream to display the second field of view in the live-view interface.

Another example includes a non-transitory computer readable medium storing instructions that when executed by a computing device cause the computing device to perform functions. The functions comprise operating a first camera having a first field of view of an environment to capture a first image stream representing the first field of view and operating a second camera having a second field of view of the environment to capture a second image stream representing the second field of view. The first field of view may be wider than the second field of view. The functions further include initially using the first image stream to display the first field of view in a live-view interface of a graphic display and, while displaying the first image stream in the live-view interface, receiving an input corresponding to a zoom command. The functions further include, in response to receiving the input, (a) switching from using the first image stream to display the first field of view in the live-view interface to using a combination of the first image stream and the second stream to display a transitional field of view of the environment in the live-view interface and (b) subsequently switching to using the second image stream to display the second field of view in the live-view interface.

In still another example, a system is provided that comprises a processor and a non-transitory computer readable medium storing instructions that when executed by the processor cause the system to perform functions. The functions comprise operating a first camera having a first field of view of an environment, to capture a first image stream representing the first field of view and operating a second camera having a second field of view of the environment, to capture a second image stream representing the second field of view. The first field of view may be wider than the second field of view. The functions further include initially using the first image stream to display the first field of view in a live-view interface of a graphic display and, while displaying the first image stream in the live-view interface, receiving an input corresponding to a zoom command. The functions further include, in response to receiving the input, (a) switching from using the first image stream to display the first field of view in the live-view interface to using a combination of the first image stream and the second stream to display a transitional field of view of the environment in the live-view interface; and (b) subsequently switching to using the second image stream to display the second field of view in the live-view interface.

In yet another example, a system is provided that includes a means for operating a first camera having a first field of view of an environment, to capture a first image stream representing the first field of view and operating a second camera having a second field of view of the environment, to capture a second image stream representing the second field of view. The first field of view may be wider than the second field of view. The system further includes means for initially using the first image stream to display the first field of view in a live-view interface of a graphic display and, while displaying the first image stream in the live-view interface, receiving an input corresponding to a zoom command. The system further includes means for, in response to receiving the input, (a) switching from using the first image stream to display the first field of view in the live-view interface to using a combination of the first image stream and the second stream to display a transitional field of view of the environment in the live-view interface and (b) subsequently switching to using the second image stream to display the second field of view in the live-view interface.

Another example method may include operating a first camera having a first field of view of an environment, to capture a first image stream representing the first field of view and operating a second camera having a second field of view of the environment, to capture a second image stream representing the second field of view. The second field of view may be wider than the first field of view. The method further includes initially using the first image stream to display the first field of view in a live-view interface of a graphic display and, while displaying the first image stream in the live-view interface, receiving an input corresponding to a zoom command. The method may further include, in response to receiving the input, (a) switching from using the first image stream to display the first field of view in the live-view interface to using a combination of the first image stream and the second stream to display a transitional field of view of the environment in the live-view interface, and (b) subsequently switching to using the second image stream to display the second field of view in the live-view interface.

In yet another example, a system is provided that includes means for operating a first camera having a first field of view of an environment, to capture a first image stream representing the first field of view and operating a second camera having a second field of view of the environment, to capture a second image stream representing the second field of view. The second field of view may be wider than the first field of view. The system further includes means for initially using the first image stream to display the first field of view in a live-view interface of a graphic display and, while displaying the first image stream in the live-view interface, receiving an input corresponding to a zoom command. The system may further include means for, in response to receiving the input, (a) switching from using the first image stream to display the first field of view in the live-view interface to using a combination of the first image stream and the second stream to display a transitional field of view of the environment in the live-view interface, and (b) subsequently switching to using the second image stream to display the second field of view in the live-view interface.

In another example, a mobile device is provided that includes a first camera arranged on a surface of the mobile device and having a first field of view, and a second camera arranged on the surface of the mobile device and having a second field of view. The first field of view is wider than the second field of view. An optical axis of the second camera is substantially parallel to an optical axis of the first camera. The mobile device further includes a graphic display and a control system that is operable to: operate the first camera to capture a first image stream, operate the second camera to capture a second image stream, and use the first image stream to display an image stream of the first field of view in a live-view interface. The live-view interface is displayed on the graphic display. The control system is further operable to, while displaying the image stream of the first field of view in the live-view interface, receive an input corresponding to a zoom command and, in response to receiving the zoom command, switch to use of the second image stream to display an image stream of the second field of view in the live-view interface.

These as well as other aspects, advantages, and alternatives will become apparent to those of ordinary skill in the art by reading the following detailed description, with reference where appropriate to the accompanying drawings.

BRIEF DESCRIPTION OF THE DRAWINGS

FIG. 7E illustrates a reduced image frame representing the second image frame of FIG. 7D after the second image frame has been reduced.

DETAILED DESCRIPTION

Figure 1A:
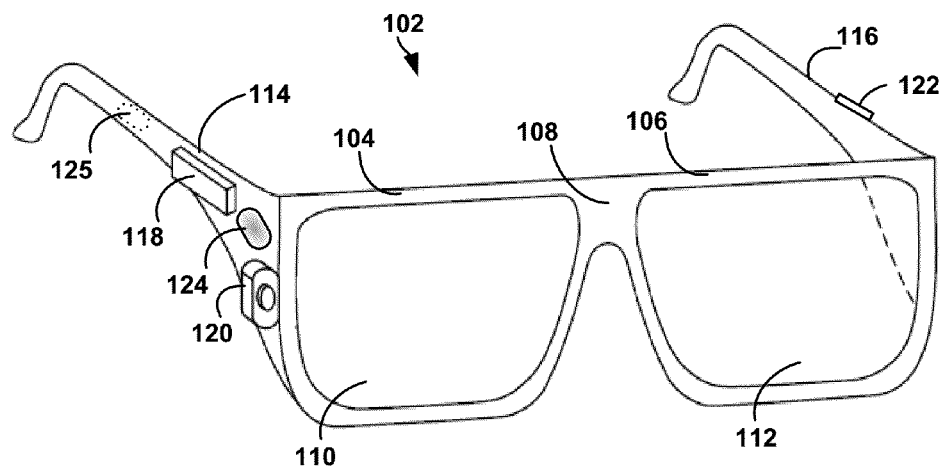
FIG. 1A illustrates a wearable computing system according to an example embodiment.

Example methods and systems are described herein. It should be understood that the words "example," "exemplary," and "illustrative" are used herein to mean "serving as an example, instance, or illustration." Any embodiment or feature described herein as being an "example," being "exemplary," or being "illustrative" is not necessarily to be construed as preferred or advantageous over other embodiments or features. The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. OVERVIEW

In the context of an optical system, it is often desirable to have zoom capability. Zoom effects can be displayed within a viewfinder of the optical system before image capture, or as an image processing technique after an image is captured by the optical system. Optical zoom involves changing an effective focal length of the optical system before image capture, which also changes a field of view of the optical system. Optical zoom is typically performed by changing relative displacement between lenses of the optical system, changing refractive indices of the lenses, or deforming surfaces of the lenses. These techniques can require various mechanical means (e.g., moving optical elements), which can add to the complexity or cost of the optical system. On the other hand, digital zoom involves pixel interpolation within a viewfinder of the optical system or post-image capture processing. Digital zoom can provide a somewhat increased level of detail for the viewer, but has computational resource costs and is limited in how much zoom can be provided. Further, since digital zoom essentially involves cropping an image, and reduces the amount of the image sensor that is used for image capture, digital zoom may reduce the amount of detail that is captured as compared to optical zoom.

In an example embodiment, a device such as mobile phone may include multiple fixed-focal length cameras having differing fields of view (or perhaps a single camera system having multiple fixed-focal length lenses). These cameras may be oriented substantially the same direction so that they capture different fields of view of the same environment (e.g., narrower or wider fields of view). According to an example embodiment, the device may operate multiple fixed-focal length cameras simultaneously to provide a responsive (and perhaps instantaneous) optical zoom feature in a live-view interface and/or in other applications. As an example, instead of altering optical characteristics of a single camera via optical zoom or manipulating images via digital zoom image processing, two cameras with fixed optical elements (e.g., lenses) can be used to provide a continuous spectrum of zoom.

In some embodiments, a first camera may be configured to capture an image of a first field of view of an environment while a second camera is configured to capture a narrower second field of view of the environment. The first and second cameras may share an optical axis or have distinct and parallel optical axes. The first camera may capture a first image stream and the second camera may capture a second image stream. In a live-view interface, the optical system may initially display the (wide-angle) first image stream. The system may receive an input related to a zoom command and in response may switch from displaying the first image stream to displaying a transitional image stream of composite image frames that combine portions of frames from the first (wide-angle) image stream and the second (narrow-angle) image stream.

The transitional image stream may include composite image frames that include a border region captured with the first (wide-angle) camera and a center region captured with the second (narrow-angle) camera. Images captured by the first camera and the second camera may be processed, resized, and merged to form the composite image. The center regions of the composite image frames include increased levels of detail when compared to the border regions, while the border regions widen the narrow field of view represented by the composite image frame. Within the transitional image stream, border regions representing the first field of view may appear to recede and center portions representing the second field of view may appear to expand as each successive composite image frame is displayed, giving the appearance of a smooth zoom effect between the wider first field of view and the narrower second field of view.

II. EXAMPLE COMPUTING DEVICES

Systems and devices in which example embodiments may be implemented will now be described in greater detail. In general, an example system may be implemented in or may take the form of a wearable computer (also referred to as a wearable computing device). In an example embodiment, a wearable computer takes the form of or includes a head-mountable device (HMD).

An example system may also be implemented in or take the form of other devices, such as a mobile phone, among other possibilities. Further, an example system may take the form of non-transitory computer readable medium, which has program instructions stored thereon that are executable by at a processor to provide the functionality described herein. An example system may also take the form of a device such as a wearable computer or mobile phone, or a subsystem of such a device, which includes such a non-transitory computer readable medium having such program instructions stored thereon.

An HMD may generally be any display device that is capable of being worn on the head and places a display in front of one or both eyes of the wearer. An HMD may take various forms such as a helmet or eyeglasses. As such, references to "eyeglasses" or a "glasses-style" HMD should be understood to refer to an HMD that has a glasses-like frame so that it can be worn on the head. Further, example embodiments may be implemented by or in association with an HMD with a single display or with two displays, which may be referred to as a "monocular" HMD or a "binocular" HMD, respectively.

FIG. 1A illustrates a wearable computing system according to an example embodiment. In FIG. 1A, the wearable computing system takes the form of a head-mountable device (HMD) 102 (which may also be referred to as a head-mounted display). It should be understood, however, that example systems and devices may take the form of or be implemented within or in association with other types of devices, without departing from the scope of the invention. As illustrated in FIG. 1A, the HMD 102 includes frame elements including lens-frames 104, 106 and a center frame support 108, lens elements 110, 112, and extending side-arms 114, 116. The center frame support 108 and the extending side-arms 114, 116 are configured to secure the HMD 102 to a user's face via a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the HMD 102. Other materials may be possible as well.

One or more of each of the lens elements 110, 112 may be formed of any material that can suitably display a projected image or graphic. Each of the lens elements 110, 112 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 114, 116 may each be projections that extend away from the lens-frames 104, 106, respectively, and may be positioned behind a user's ears to secure the HMD 102 to the user. The extending side-arms 114, 116 may further secure the HMD 102 to the user by extending around a rear portion of the user's head. Additionally or alternatively, for example, the HMD 102 may connect to or be affixed within a head-mounted helmet structure. Other configurations for an HMD are also possible.

The HMD 102 may also include an on-board computing system 118, an image capture device 120, a sensor 122, and a finger-operable touch pad 124. The on-board computing system 118 is shown to be positioned on the extending side-arm 114 of the HMD 102; however, the on-board computing system 118 may be provided on other parts of the HMD 102 or may be positioned remote from the HMD 102 (e.g., the on-board computing system 118 could be wire- or wirelessly-connected to the HMD 102). The on-board computing system 118 may include a processor and memory, for example. The on-board computing system 118 may be configured to receive and analyze data from the image capture device 120 and the finger-operable touch pad 124 (and possibly from other sensory devices, user interfaces, or both) and generate images for output by the lens elements 110 and 112.

The image capture device 120 may be, for example, a camera that is configured to capture still images and/or to capture video. In the illustrated configuration, image capture device 120 is positioned on the extending side-arm 114 of the HMD 102; however, the image capture device 120 may be provided on other parts of the HMD 102. The image capture device 120 may be configured to capture images at various resolutions or at different frame rates. Many image capture devices with a small form-factor, such as the cameras used in mobile phones or webcams, for example, may be incorporated into an example of the HMD 102.

Further, although FIG. 1A illustrates one image capture device 120, more image capture devices may be used, and each may be configured to capture the same view, or to capture different views. For example, the image capture device 120 may be forward facing to capture at least a portion of the real-world view perceived by the user. This forward facing image captured by the image capture device 120 may then be used to generate an augmented reality where computer generated images appear to interact with or overlay the real-world view perceived by the user.

The sensor 122 is shown on the extending side-arm 116 of the HMD 102; however, the sensor 122 may be positioned on other parts of the HMD 102. For illustrative purposes, only one sensor 122 is shown. However, in an example embodiment, the HMD 102 may include multiple sensors. For example, an HMD 102 may include sensors 102 such as one or more gyroscopes, one or more accelerometers, one or more magnetometers, one or more image sensors, one or more infrared sensors, and/or one or more microphones. Other sensing devices may be included in addition or in the alternative to the sensors that are specifically identified herein.

The finger-operable touch pad 124 is shown on the extending side-arm 114 of the HMD 102. However, the finger-operable touch pad 124 may be positioned on other parts of the HMD 102. Also, more than one finger-operable touch pad may be present on the HMD 102. The finger-operable touch pad 124 may be used by a user to input commands. The finger-operable touch pad 124 may sense at least one of a pressure, position and/or a movement of one or more fingers via capacitive sensing, resistance sensing, or a surface acoustic wave process, among other possibilities. The finger-operable touch pad 124 may be capable of sensing movement of one or more fingers simultaneously, in addition to sensing movement in a direction parallel or planar to the pad surface, in a direction normal to the pad surface, or both, and may also be capable of sensing a level of pressure applied to the touch pad surface. In some embodiments, the finger-operable touch pad 124 may be formed of one or more translucent or transparent insulating layers and one or more translucent or transparent conducting layers. Edges of the finger-operable touch pad 124 may be formed to have a raised, indented, or roughened surface, so as to provide tactile feedback to a user when the user's finger reaches the edge, or other area, of the finger-operable touch pad 124. If more than one finger-operable touch pad is present, each finger-operable touch pad may be operated independently, and may provide a different function.

In a further aspect, HMD 102 may be configured to receive user input in various ways, in addition or in the alternative to user input received via finger-operable touch pad 124. For example, on-board computing system 118 may implement a speech-to-text process and utilize a syntax that maps certain spoken commands to certain actions. In addition, HMD 102 may include one or more microphones via which a wearer's speech may be captured. Configured as such, HMD 102 may be operable to detect spoken commands and carry out various computing functions that correspond to the spoken commands.

As another example, HMD 102 may interpret certain head-movements as user input. For example, when HMD 102 is worn, HMD 102 may use one or more gyroscopes and/or one or more accelerometers to detect head movement. The HMD 102 may then interpret certain head-movements as being user input, such as nodding, or looking up, down, left, or right. An HMD 102 could also pan or scroll through graphics in a display according to movement. Other types of actions may also be mapped to head movement.

As yet another example, HMD 102 may interpret certain gestures (e.g., by a wearer's hand or hands) as user input. For example, HMD 102 may capture hand movements by analyzing image data from image capture device 120, and initiate actions that are defined as corresponding to certain hand movements.

As a further example, HMD 102 may interpret eye movement as user input. In particular, HMD 102 may include one or more inward-facing image capture devices and/or one or more other inward-facing sensors (not shown) sense a user's eye movements and/or positioning. As such, certain eye movements may be mapped to certain actions. For example, certain actions may be defined as corresponding to movement of the eye in a certain direction, a blink, and/or a wink, among other possibilities.

HMD 102 also includes a speaker 125 for generating audio output. In one example, the speaker could be in the form of a bone conduction speaker, also referred to as a bone conduction transducer (BCT). Speaker 125 may be, for example, a vibration transducer or an electroacoustic transducer that produces sound in response to an electrical audio signal input. The frame of HMD 102 may be designed such that when a user wears HMD 102, the speaker 125 contacts the wearer. Alternatively, speaker 125 may be embedded within the frame of HMD 102 and positioned such that, when the HMD 102 is worn, speaker 125 vibrates a portion of the frame that contacts the wearer. In either case, HMD 102 may be configured to send an audio signal to speaker 125, so that vibration of the speaker may be directly or indirectly transferred to the bone structure of the wearer. When the vibrations travel through the bone structure to the bones in the middle ear of the wearer, the wearer can interpret the vibrations provided by BCT 125 as sounds.

Various types of bone-conduction transducers (BCTs) may be implemented, depending upon the particular implementation. Generally, any component that is arranged to vibrate the HMD 102 may be incorporated as a vibration transducer. Yet further it should be understood that an HMD 102 may include a single speaker 125 or multiple speakers. In addition, the location(s) of speaker(s) on the HMD may vary, depending upon the implementation. For example, a speaker may be located proximate to a wearer's temple (as shown), behind the wearer's ear, proximate to the wearer's nose, and/or at any other location where the speaker 125 can vibrate the wearer's bone structure.

Figure 1B:
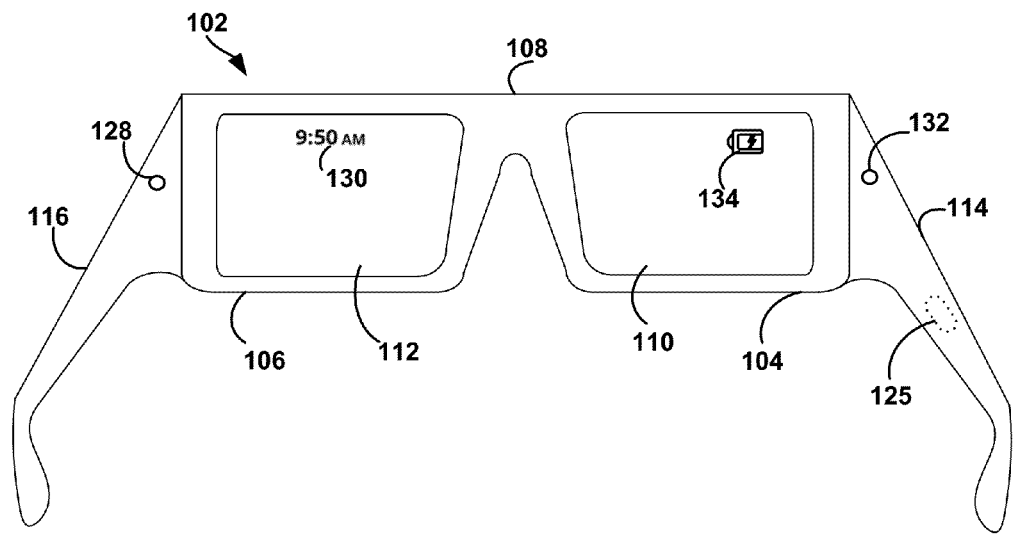
FIG. 1B illustrates an alternate view of the wearable computing device illustrated in FIG. 1A.

FIG. 1B illustrates an alternate view of the wearable computing device illustrated in FIG. 1A. As shown in FIG. 1B, the lens elements 110, 112 may act as display elements. The HMD 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system and may include a coating that reflects the light projected onto them from the projectors 128, 132. In some embodiments, a reflective coating may not be used (e.g., when the projectors 128, 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104, 106 for driving such a matrix display. Alternatively or additionally, a laser or LED source and scanning system could be used to draw a raster display directly onto the retina of one or more of the user's eyes. Other possibilities exist as well.

Figure 1C:
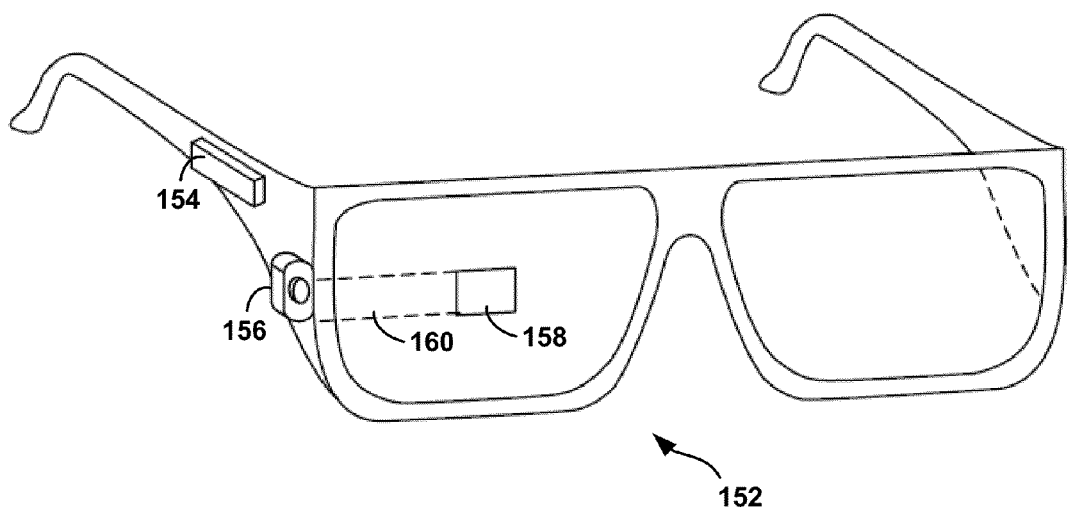
FIG. 1C illustrates another wearable computing system according to an example embodiment.

FIG. 1C illustrates another wearable computing system according to an example embodiment, which takes the form of an HMD 152. The HMD 152 may include frame elements and side-arms such as those described with respect to FIGS. 1A and 1B. The HMD 152 may additionally include an on-board computing system 154 and an image capture device 156, such as those described with respect to FIGS. 1A and 1B. The image capture device 156 is shown mounted on a frame of the HMD 152. However, the image capture device 156 may be mounted at other positions as well, or may be embedded into or otherwise attached to the frame.

As shown in FIG. 1C, the HMD 152 may include a single display 158 which may be coupled to the device. The display 158 may be formed on one of the lens elements of the HMD 152, such as a lens element described with respect to FIGS. 1A and 1B, and may be configured to overlay computer-generated graphics in the user's view of the physical world. The display 158 is shown to be provided in a center of a lens of the HMD 152, however, the display 158 may be provided in other positions, such as for example towards either the upper or lower portions of the wearer's field of view. The display 158 is controllable via the computing system 154 that is coupled to the display 158 via an optical waveguide 160.

Figure 1D:
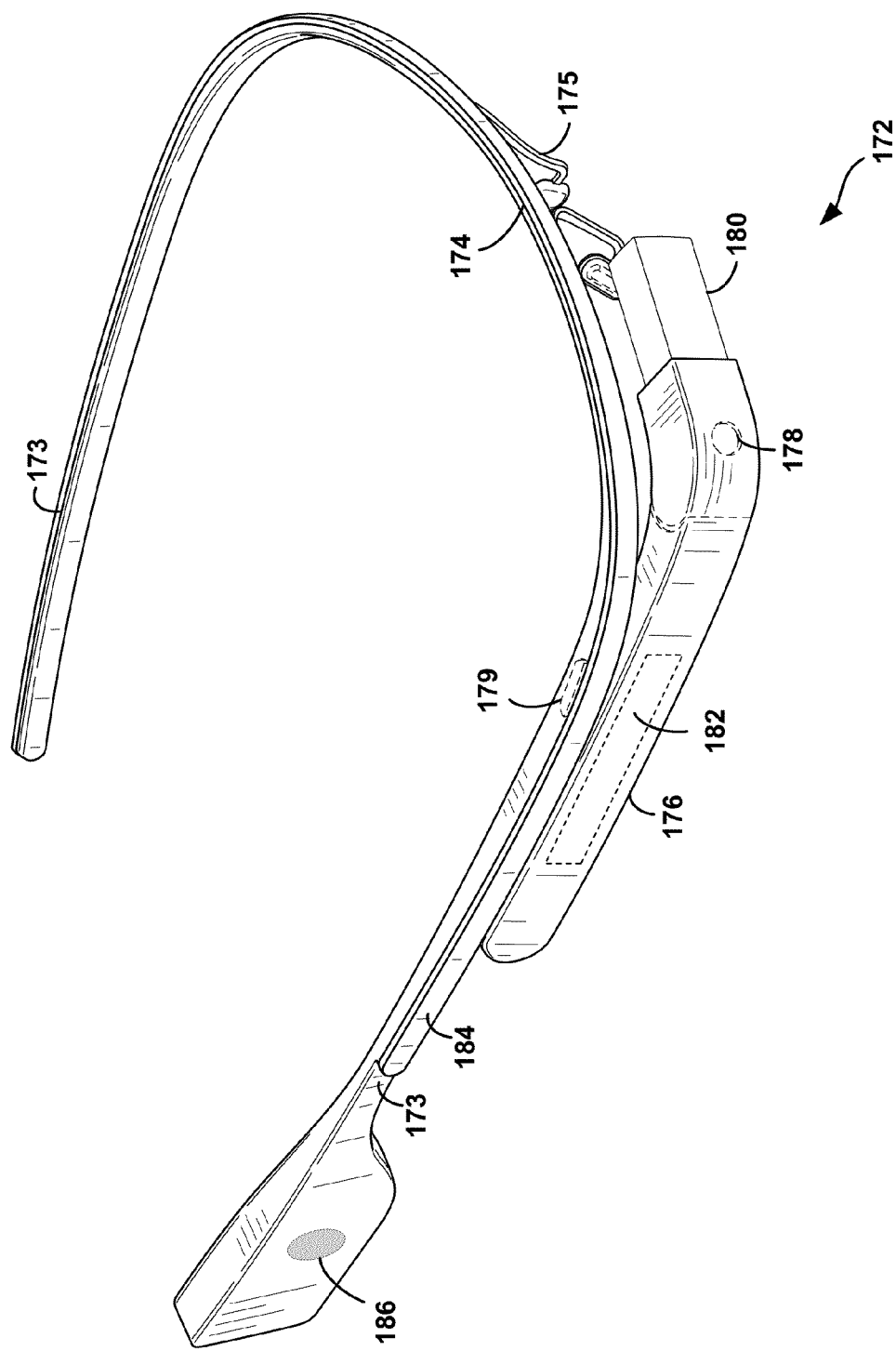
FIG. 1D illustrates another wearable computing system according to an example embodiment.

FIG. 1D illustrates another wearable computing system according to an example embodiment, which takes the form of a monocular HMD 172. The HMD 172 may include side-arms 173, a center frame support 174, and a bridge portion with nosepiece 175. In the example shown in FIG. 1D, the center frame support 174 connects the side-arms 173. The HMD 172 does not include lens-frames containing lens elements. The HMD 172 may additionally include a component housing 176, which may include an on-board computing system (not shown), an image capture device 178, and a button 179 for operating the image capture device 178 (and/or usable for other purposes). Component housing 176 may also include other electrical components and/or may be electrically connected to electrical components at other locations within or on the HMD. HMD 172 also includes a BCT 186.

The HMD 172 may include a single display 180, which may be coupled to one of the side-arms 173 via the component housing 176. In an example embodiment, the display 180 may be a see-through display, which is made of glass and/or another transparent or translucent material, such that the wearer can see their environment through the display 180. Further, the component housing 176 may include the light sources (not shown) for the display 180 and/or optical elements (not shown) to direct light from the light sources to the display 180. As such, display 180 may include optical features that direct light that is generated by such light sources towards the wearer's eye, when HMD 172 is being worn.

In a further aspect, HMD 172 may include a sliding feature 184, which may be used to adjust the length of the side-arms 173. Thus, sliding feature 184 may be used to adjust the fit of HMD 172. Further, an HMD may include other features that allow a wearer to adjust the fit of the HMD, without departing from the scope of the invention.

Figure 1E:
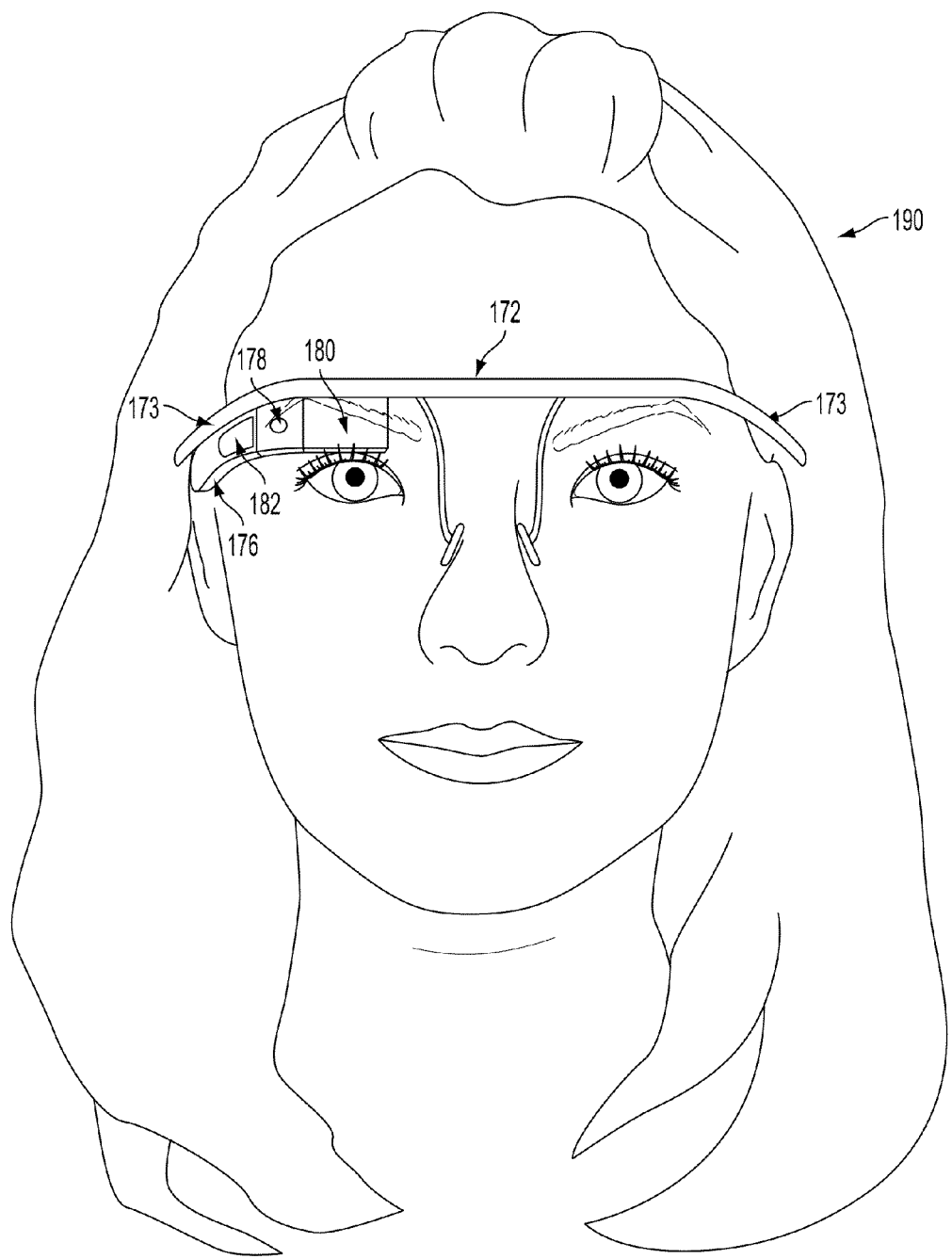
FIG. 1E is a simplified illustration of the wearable computing system shown in FIG. 1D, being worn by a wearer.
Figure 1F:
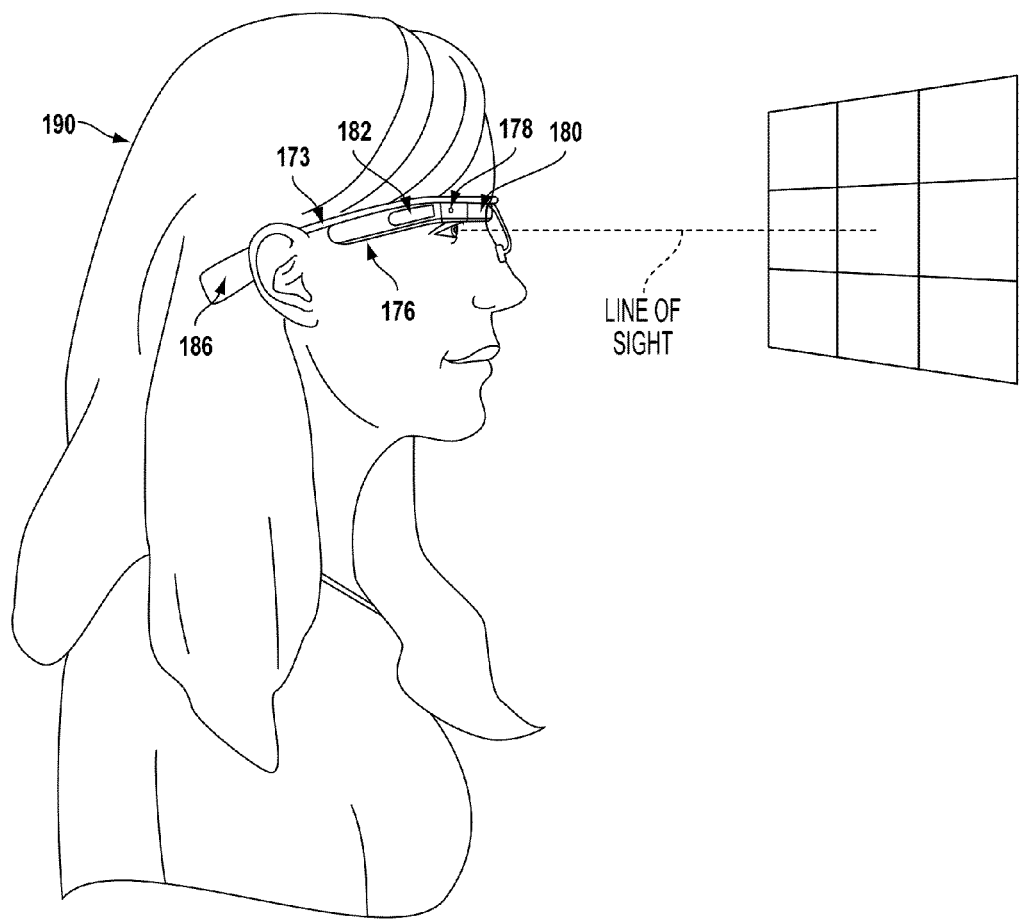
FIG. 1F is a simplified illustration of the wearable computing system shown in FIG. 1D, being worn by a wearer.
Figure 1G:
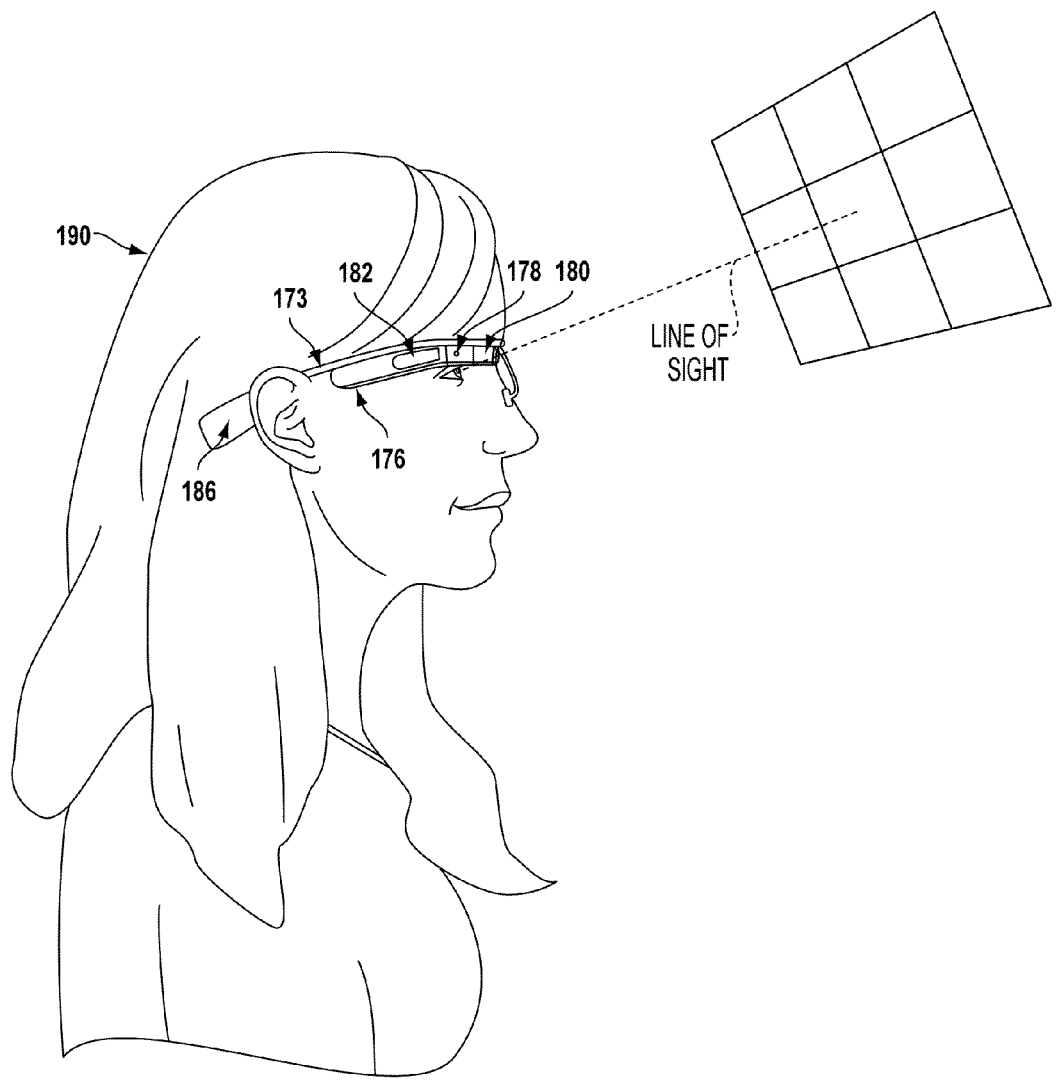
FIG. 1G is a simplified illustration of the wearable computing system shown in FIG. 1D, being worn by a wearer.

FIGS. 1E to 1G are simplified illustrations of the HMD 172 shown in FIG. 1D, being worn by a wearer 190. As shown in FIG. 1F, BCT 186 is arranged such that when HMD 172 is worn, BCT 186 is located behind the wearer's ear. As such, BCT 186 is not visible from the perspective shown in FIG. 1E.

In the illustrated example, the display 180 may be arranged such that when HMD 172 is worn, display 180 is positioned in front of or proximate to a user's eye when the HMD 172 is worn by a user. For example, display 180 may be positioned below the center frame support and above the center of the wearer's eye, as shown in FIG. 1E. Further, in the illustrated configuration, display 180 may be offset from the center of the wearer's eye (e.g., so that the center of display 180 is positioned to the right and above of the center of the wearer's eye, from the wearer's perspective).

Configured as shown in FIGS. 1E to 1G, display 180 may be located in the periphery of the field of view of the wearer 190, when HMD 172 is worn. Thus, as shown by FIG. 1F, when the wearer 190 looks forward, the wearer 190 may see the display 180 with their peripheral vision. As a result, display 180 may be outside the central portion of the wearer's field of view when their eye is facing forward, as it commonly is for many day-to-day activities. Such positioning can facilitate unobstructed eye-to-eye conversations with others, as well as generally providing unobstructed viewing and perception of the world within the central portion of the wearer's field of view. Further, when the display 180 is located as shown, the wearer 190 may view the display 180 by, e.g., looking up with their eyes only (possibly without moving their head). This is illustrated as shown in FIG. 1G, where the wearer has moved their eyes to look up and align their line of sight with display 180. A wearer might also use the display by tilting their head down and aligning their eye with the display 180.

Figure 2:
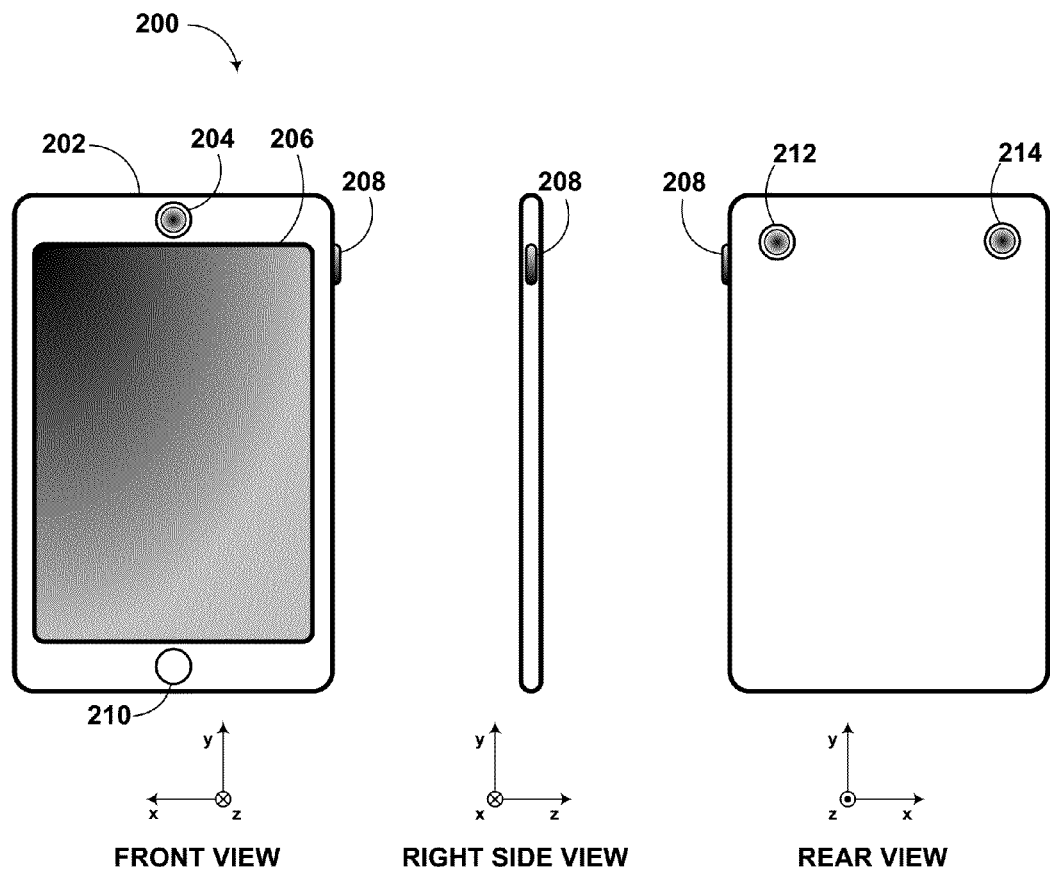
FIG. 2 depicts front, right side, and rear views of a digital camera device, in accordance with an example embodiment

Other image capture devices or digital cameras may be standalone devices or integrated with other devices. As an example, FIG. 2 illustrates the form factor of a digital camera device 200. Digital camera device 200 may be, for example, a mobile phone, a tablet computer, or a wearable computing device. However, other embodiments are possible. Digital camera device 200 may include various elements, such as a body 202, a front-facing camera 204, a multi-element display 206, a shutter button 208, and other buttons 210. Front-facing camera 204 may be positioned on a side of body 202 typically facing a user while in operation, or on the same side as multi-element display 206.

Digital camera device 200 could further include two rear-facing cameras 212 and 214. Rear-facing cameras 212 and 214 may be positioned on a side of body 202 opposite front-facing camera 204. Note that referring to the cameras as front and rear facing is arbitrary and digital camera device 200 may include multiple cameras positioned on various sides of body 202. Further, the lenses of rear-facing cameras 212 and 214 are arranged on the upper corner on the back of digital camera device 200, and are oriented in substantially the same direction. (Note that herein, references to cameras being oriented in the same direction should be understood to mean that the lenses of the cameras point in substantially the same direction.)

It should be understood that other multi-camera arrangements are possible. In particular, the lenses of two or more cameras, which are all oriented in substantially the same direction, may be arranged in different formations on a surface of the phone.

Figure 3:
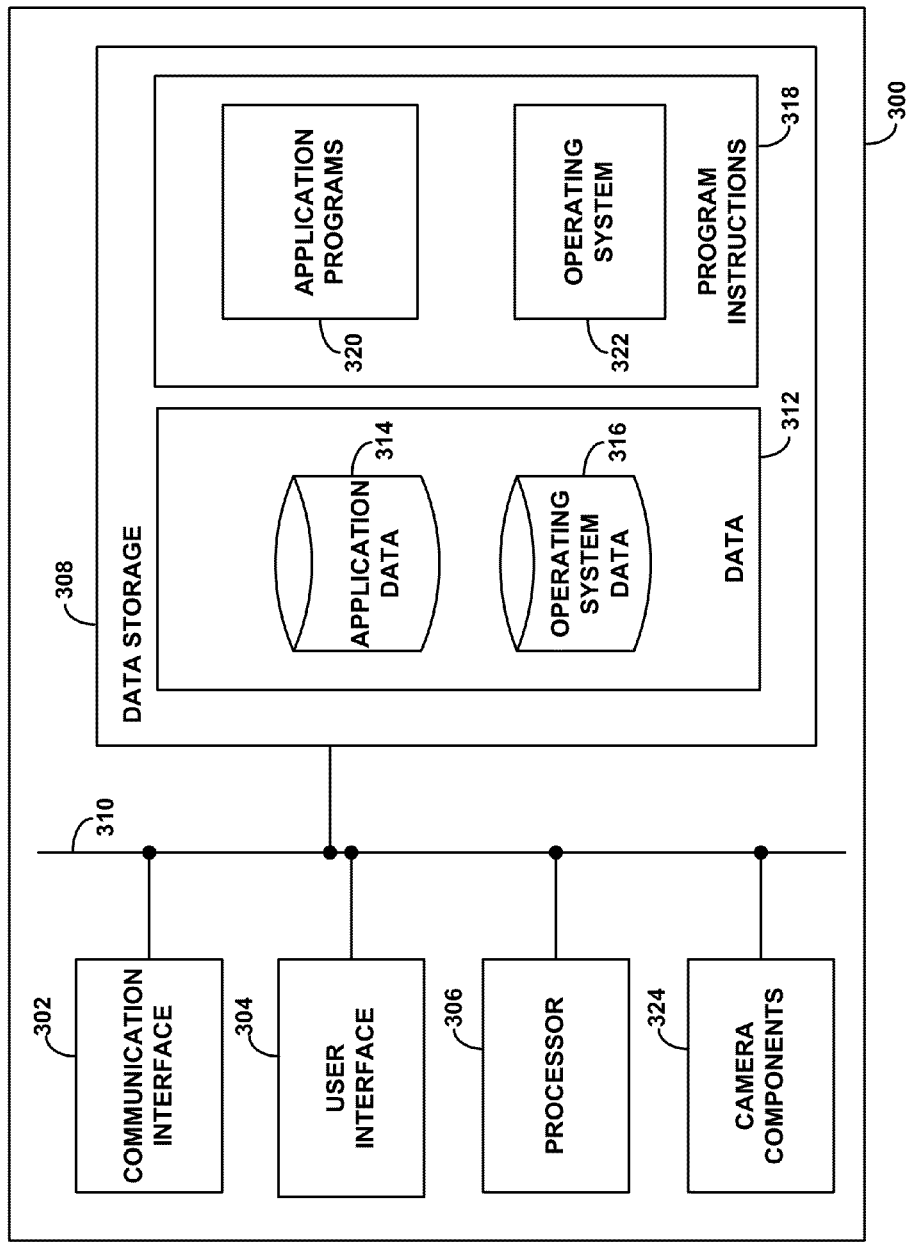
FIG. 3 is a simplified block diagram of a computing device according to an example embodiment.

As noted above, the functions of digital camera device 200—or another type of digital camera—may be integrated into or take the form of a computing device, such as a mobile phone, tablet computer, laptop computer and so on. For purposes of example, FIG. 3 is a simplified block diagram showing some of the components of an example computing device 300 that may include camera components 324. Camera components 324 may include multiple cameras, such as cameras 212 and 214.

By way of example and without limitation, computing device 300 may be a cellular mobile telephone (e.g., a smartphone), a still camera, a video camera, a fax machine, a computer (such as a desktop, notebook, tablet, or handheld computer), a personal digital assistant (PDA), a home automation component, a digital video recorder (DVR), a digital television, a remote control, a wearable computing device, or some other type of device equipped with at least some image capture and/or image processing capabilities. It should be understood that computing device 300 may represent a physical camera device such as a digital camera, a particular physical hardware platform on which a camera application operates in software, or other combinations of hardware and software that are configured to carry out camera functions.

As shown in FIG. 3, computing device 300 may include a communication interface 302, a user interface 304, a processor 306, data storage 308, and camera components 324, all of which may be communicatively linked together by a system bus, network, or other connection mechanism 310.

Communication interface 302 may function to allow computing device 300 to communicate, using analog or digital modulation, with other devices, access networks, and/or transport networks. Thus, communication interface 302 may facilitate circuit-switched and/or packet-switched communication, such as plain old telephone service (POTS) communication and/or Internet protocol (IP) or other packetized communication. For instance, communication interface 302 may include a chipset and antenna arranged for wireless communication with a radio access network or an access point. Also, communication interface 302 may take the form of or include a wireline interface, such as an Ethernet, Universal Serial Bus (USB), or High-Definition Multimedia Interface (HDMI) port. Communication interface 302 may also take the form of or include a wireless interface, such as a Wifi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 302. Furthermore, communication interface 302 may comprise multiple physical communication interfaces (e.g., a Wifi interface, a BLUETOOTH® interface, and a wide-area wireless interface).

User interface 304 may function to allow computing device 300 to interact with a human or non-human user, such as to receive input from a user and to provide output to the user. Thus, user interface 304 may include input components such as a keypad, keyboard, touch-sensitive or presence-sensitive panel, computer mouse, trackball, joystick, microphone, and so on. User interface 304 may also include one or more output components such as a display screen which, for example, may be combined with a presence-sensitive panel. The display screen may be based on CRT, LCD, and/or LED technologies, or other technologies now known or later developed. User interface 304 may also be configured to generate audible output(s), via a speaker, speaker jack, audio output port, audio output device, earphones, and/or other similar devices.

In some embodiments, user interface 304 may include a display that serves as a viewfinder for still camera and/or video camera functions supported by computing device 300. Additionally, user interface 304 may include one or more buttons, switches, knobs, and/or dials that facilitate the configuration and focusing of a camera function and the capturing of images (e.g., capturing a picture). It may be possible that some or all of these buttons, switches, knobs, and/or dials are implemented as functions on a touch- or proximity-sensitive panel.

Processor 306 may comprise one or more general purpose processors—e.g., microprocessors—and/or one or more special purpose processors—e.g., digital signal processors (DSPs), graphics processing units (GPUs), floating point units (FPUs), network processors, or application-specific integrated circuits (ASICs). In some instances, special purpose processors may be capable of image processing, image alignment, and merging images, among other possibilities. Data storage 308 may include one or more volatile and/or non-volatile storage components, such as magnetic, optical, flash, or organic storage, and may be integrated in whole or in part with processor 306. Data storage 308 may include removable and/or non-removable components.

Processor 306 may be capable of executing program instructions 318 (e.g., compiled or non-compiled program logic and/or machine code) stored in data storage 308 to carry out the various functions described herein. Therefore, data storage 308 may include a non-transitory computer-readable medium, having stored thereon program instructions that, upon execution by computing device 300, cause computing device 300 to carry out any of the methods, processes, or functions disclosed in this specification and/or the accompanying drawings. The execution of program instructions 318 by processor 306 may result in processor 306 using data 312.

By way of example, program instructions 318 may include an operating system 322 (e.g., an operating system kernel, device driver(s), and/or other modules) and one or more application programs 320 (e.g., camera functions, address book, email, web browsing, social networking, and/or gaming applications) installed on computing device 300. Similarly, data 312 may include operating system data 316 and application data 314. Operating system data 316 may be accessible primarily to operating system 322, and application data 314 may be accessible primarily to one or more of application programs 320. Application data 314 may be arranged in a file system that is visible to or hidden from a user of computing device 300.

Application programs 320 may communicate with operating system 322 through one or more application programming interfaces (APIs). These APIs may facilitate, for instance, application programs 320 reading and/or writing application data 314, transmitting or receiving information via communication interface 302, receiving and/or displaying information on user interface 304, and so on.

In some vernaculars, application programs 320 may be referred to as "apps" for short. Additionally, application programs 320 may be downloadable to computing device 300 through one or more online application stores or application markets. However, application programs can also be installed on computing device 300 in other ways, such as via a web browser or through a physical interface (e.g., a USB port) on computing device 300.

Camera components 324 may include, but are not limited to, an aperture, shutter, recording surface (e.g., photographic film and/or an image sensor), lens, and/or shutter button. Camera components 324 may be controlled at least in part by software executed by processor 306. Further, camera components 324 may include multiple camera systems, which each include an aperture, shutter, recording surface lens, image sensor, processor, and/or shutter button.

When multiple camera systems are included, there may be some components that are shared between the systems, and other components that are not shared. For example, each camera could include its own aperture, lens, and image sensor, while sharing other components such as a processor and a shutter button. As another example, each camera could include its own lens, but share the same image sensor. Alternatively, each camera system's components may be utilized only for that camera system, and not shared with other camera systems.

Figure 4A:
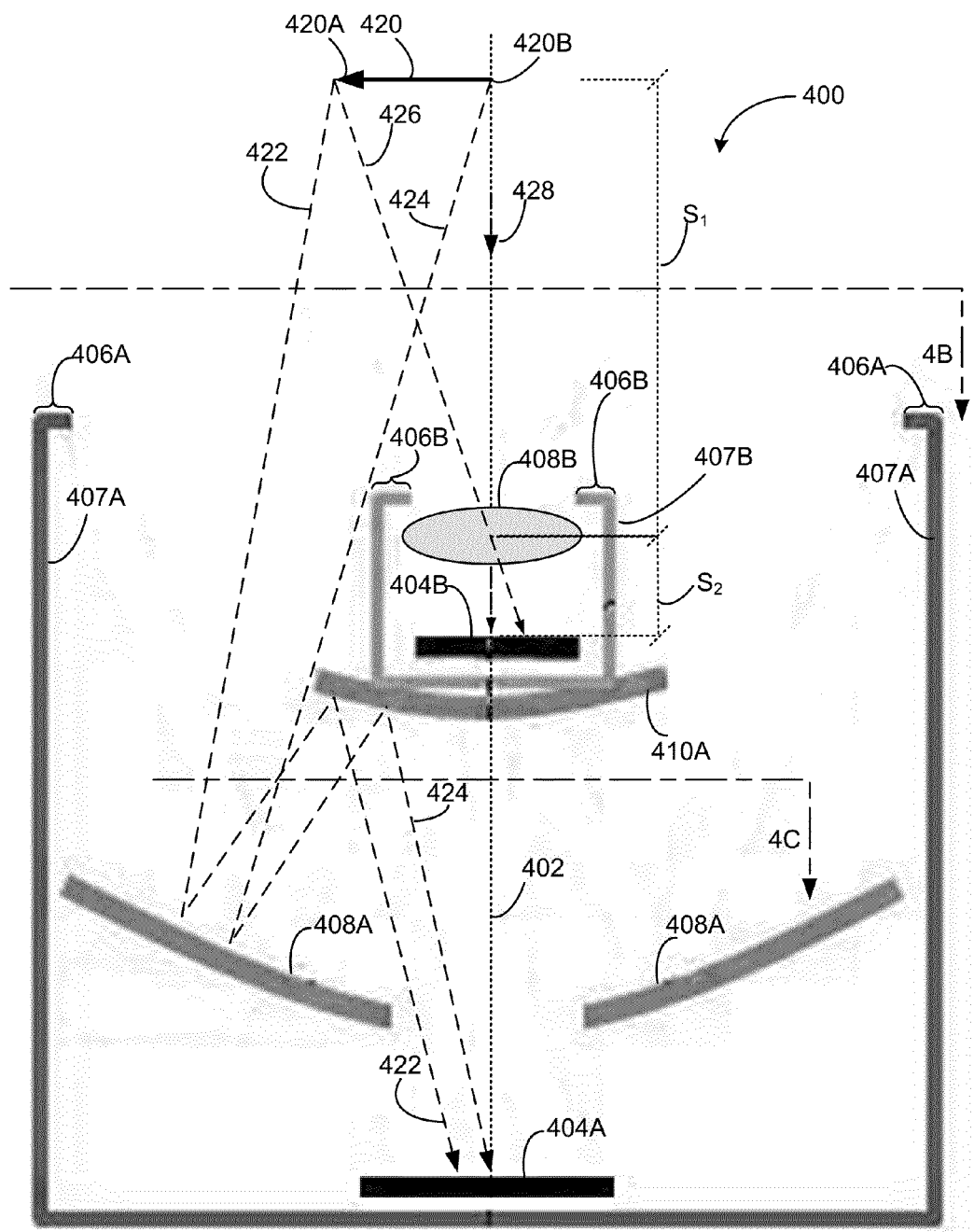
FIG. 4A illustrates a side view cross section of an example dual imaging system.

FIG. 4A illustrates a side view cross section of an example dual imaging system 400. A first imaging system of the dual imaging system 400 further includes a first image sensor 404A, a first aperture stop 406A, a first wall 407A, a first reflector 408A, and a second reflector 410A. The dual imaging system 400 also includes a second imaging system comprising a second image sensor 404B, a second aperture stop 406B, a second wall 407B, and a lens 408B. FIG. 4A further includes an object 420 with a first end 420A and a second end 420B, and light rays 422, 424, 426, and 428. Both the first and second image sensors 404A and 404B may be configured to capture light travelling downward relative to the optical axis 402. Any portions or components of the dual imaging system may be arranged along, or around, a common optical axis 402.

It should be noted that dimensions of the dual imaging system 400 or the object 420 represented in FIG. 4A may not be to scale, and are for illustrative purposes only. It should also be noted that any depicted angles and/or directions of refraction or reflection depicted in FIG. 4A are purely for illustrative purposes and are not necessarily to scale.

The optical axis 402 may define an axis of rotational symmetry (or other axis of symmetry) for image sensors 404A and 404B, the aperture stops 406A and 406B, the first reflector 408A, the lens 408B, the second reflector 410A, and the dual imaging system 400 as a whole. For example, a light ray such as the light ray 428 that travels along the optical axis 402 may pass through a second aperture defined by the aperture stop 406B, pass through the lens 408B, and reach the second image sensor 404B without being refracted (i.e. having its direction of travel changed). The second aperture may be a disc-shaped portion of a plane that is surrounded by the second aperture stop 406B.

The image sensors 404A and 404B may be configured to capture images of light incident upon the image sensors 404A and 404B from a common viewpoint and to provide data to a computing system (i.e. via an input/output interface) representing the respective captured images. The image sensors 404A and 404B may include a CMOS (complementary metal oxide semiconductor) sensor or a CCD (charge-coupled device) sensor, among other possibilities. The image sensors 404A and 404B may be aligned perpendicularly to the optical axis 402 and face the same direction (upward in this example). In this example the first image sensor 404A is located below the second image sensor 404B and along the optical axis 402.

The first wall 407A may provide structural support for the dual imaging system 400. For example, the first image sensor 404A may be mounted to a bottom interior portion of the first wall 407A and/or side portions of the first wall 407A. The first reflector 408A and the second reflector 410A may also be mounted to a bottom or side portion of the first wall 407A. Or, the second reflector 410A may be mounted to the first wall 407A with narrow radial support beams or to a window located coplanar with the first aperture. Structural descriptions included herein are included for illustrative purposes only. Other structural examples are possible.

The first imaging system comprising the first image sensor 404A, the first aperture stop 406A, the first reflector 408A, and the second reflector 410A, may be configured to capture images of the object 420. For example, the light ray 422 may travel from the first end 420A of the object 420, past the second imaging system, and be reflected by the first reflector 408A toward the second reflector 410A. The light ray 422 may further be reflected by the second reflector 410A and become incident upon the first image sensor 404A.

The first reflector 408A may be a curved section of glass or other material coated with a smooth reflective metal layer on one or more surfaces, among other possibilities. The first reflector 408A may be a parabolic or concave reflector configured to reflect incident light rays travelling downward with respect to the optical axis 402 toward a focus of the first reflector 408A. (The focus of the first reflector 408A may be located above the second reflector 410A, but is not depicted in FIG. 4A). The focus of the first reflector 408A may also be a first focus of the second reflector 410A. The first reflector 408A may be symmetrically aligned along the optical axis 402 and located below the second image sensor 404B.

The second reflector 410A may also be a curved section of glass or other material coated with a smooth reflective metal layer on one or more surfaces, among other possibilities. The second reflector 410A may be a hyperbolic or convex reflector configured to reflect incident light rays toward a second focus (not shown) of the second reflector 410A. The second focus of the second reflector 410A may be below the first image sensor 404A. The first reflector 408A may include an opening centered along the optical axis 402 that allows light rays reflected by the second reflector 410A to pass through the opening to the first image sensor 404A.

Similar to the light ray 422, the light ray 424 may travel from the second end 420B of the object 420, past the second imaging system, and be reflected by the first reflector 408A toward the second reflector 410A. The second reflector 410A may reflect the light ray 424 so that it is incident upon the first image sensor 404A. In this way, a real image of the object 420 may be formed upon the first image sensor 404A. Rays of light that originate from a point on the optical axis 402 and travel past the second imaging system (such as light ray 424) may be directed by components of the first imaging system to a point on the first image sensor 404A that is on the optical axis 402.

The first aperture stop 406A may surround a first aperture of the first imaging system and the second aperture stop 406B may surround a second aperture of the second imaging system. The second aperture may be located between the first aperture and the second image sensor 404B. (In another example, the first aperture may be located between the second image sensor 404B and the second reflector 410A, or between the second aperture and the second reflector 410A.) Both the first aperture and the second aperture may be disc-shaped portions of planes respectively surrounded by the first and second aperture stops 406A and 406B. Light that reaches the first image sensor 404A may cross the first aperture while light that reaches the second image sensor 404B may cross the first and second apertures. The diameter of the first aperture may vary as the inner diameter of the first aperture stop 406A is varied.

In another sense, the first aperture stop 406A and the second aperture stop 406B may together define a third annular aperture corresponding to the first imaging system. Light that reaches the first image sensor 404A may cross the annular aperture. See FIG. 4B for more detail of the annular aperture. The aperture stops 406A and 406B may be adjustable so that the first and second image sensors 404A and 404B are configured to capture an image with a common viewpoint and/or with a common field of view.

The second imaging system, with respect to the optical axis 402, may be located radially within the first wall 407A of the first imaging system. The second imaging system could be located anywhere along the optical axis 402 with respect to the first imaging system. For example, the second aperture defined by the second aperture stop 406B could be located in front of, or behind, the first aperture defined by the first aperture stop 406A. Also, the second image sensor could be located in front of, or behind, the first aperture defined by the first aperture stop 406A.

The second image sensor 404B may be located at an image plane of the lens 408B that corresponds to the object 420. The location of the image plane of the lens 408B may be determined by equation 1:

$$1/S_1 + 1/S_2 = 1/f \qquad [1]$$

In equation 1 and FIG. 4A, S1 may represent a distance between the object 420 and the lens 408B along the optical axis 402, S2 may represent a distance between the image plane (i.e. the second image sensor 404B) and the lens 408B along the optical axis 402, while f may represent a focal length of the lens 408B.

The lens 408B may be a piece of glass or other transparent material machined and/or polished to focus light in accordance with embodiments disclosed herein. For example, the lens 408B may be configured to focus light incident upon the lens 408B to produce a real image of the object 420 upon the second image sensor 404B. Two of the light rays making up the real image of the object 420 are light rays 426 and 428, which respectively represent the first end 420A and the second end 420B of the object 420.

The second aperture stop 406B may define the second aperture through which light may pass and be captured by the second image sensor 404B. The second aperture stop 406B may have a fixed diameter, or may be adjustable to create second apertures of varying diameters. The second aperture corresponding to the second aperture stop 406B may be a disc-shaped portion of a plane parallel to the second aperture stop 406B. In other embodiments, the second aperture stop 406B may define other shapes of apertures, such as a non-circular aperture. An adjustable second aperture stop 406B may define a variable field of view of the second imaging system.

The second wall 407B may provide structural support for the second imaging system. For example, the second image sensor 404B may be mounted to a bottom portion of the second wall 407B and/or side portions of the second wall 407B. The lens 408B may be mounted to side portions of the second wall 407B. The second wall 407B may be mounted to a top non-reflective surface of the second reflector 410A. Structural descriptions included herein are included for illustrative purposes only. Other structural examples are possible.

The lens 408B may be configured to refract light incident upon the lens 408B onto the second image sensor 404B so that the second image sensor 404B may capture images. The second image sensor 404B may lie along the image plane of the lens 408B.

Figure 4B:
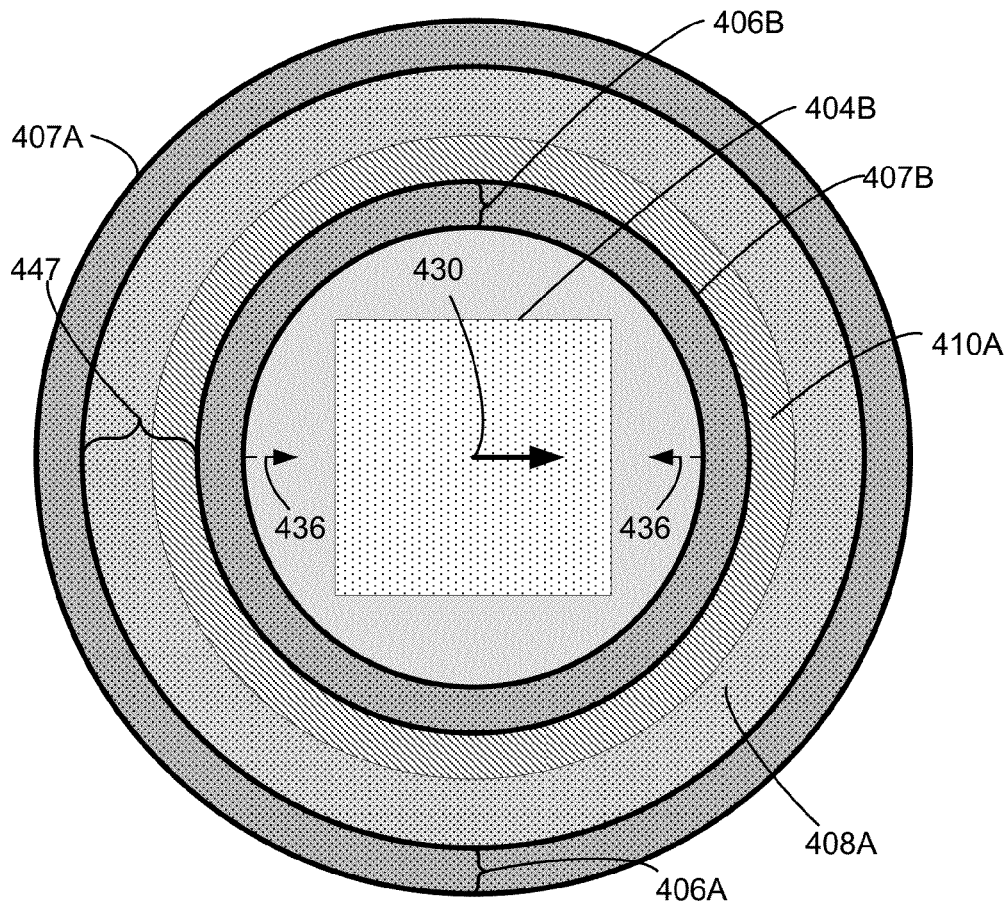
FIG. 4B is a downward view of portions of the example dual imaging system of FIG. 4A.

FIG. 4B is a downward view of portions of the example dual imaging system 400 of FIG. 4A, including the second image sensor 404B, the first aperture stop 406A, the second aperture stop 406B, the first wall 407A, the second wall 407B, the second reflector 410A, the first reflector 408A, and an image 430. (The lens 408B is not pictured.) As shown in FIG. 4B, the second image sensor 404B may be mechanically coupled to a structure that includes the second aperture stop 406B, the second wall 407B, and the second reflector 410A. The second aperture stop 406B may be configured to increase or decrease its inner diameter as shown at 436. Such changes in the inner diameter of the second aperture stop 406B may change an amount of light that reaches the second image sensor 404B and a field of view of the second imaging system. A top surface of the second reflector 410A depicted in FIG. 4B may be a non-reflective surface. The image 430 of the object 420 (of FIG. 4A) may be made up of light rays 426 and 428 (of FIG. 4A), among other light rays. Pictured below the second reflector 410A is the first reflector 408A. At the outer edge of FIG. 4B is the first aperture stop 406A. The first aperture stop 406A may be adjustable so that its inner diameter defines the first aperture corresponding to the first imaging system. The first aperture stop 406A may also define an annular aperture 447 corresponding to the first imaging system with an outer radius defined by the first aperture stop 406A and the inner radius defined by the second wall 407B or the second aperture stop 406B. Light that passes through to the first image sensor 404A (not pictured) will first pass through the annular aperture 447 (which is a portion of the first aperture defined by the first aperture stop 406).

Figure 4C:
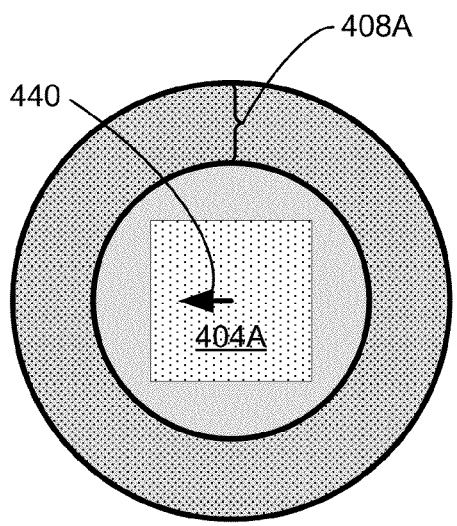
FIG. 4C is a downward view of portions of the example dual imaging system of FIG. 4A.

FIG. 4C is a downward view of portions of the example dual imaging system of FIG. 4A, including the first image sensor 404A, the first reflector 408A, and an image 440. As shown, light rays 422 and 424 (of FIG. 4A), among other light rays not shown, form the image 440 on the first image sensor 404A. The light rays 422 and 424 may travel through an opening of the first reflector 408A, depicted in FIG. 4C.

Figure 5A:
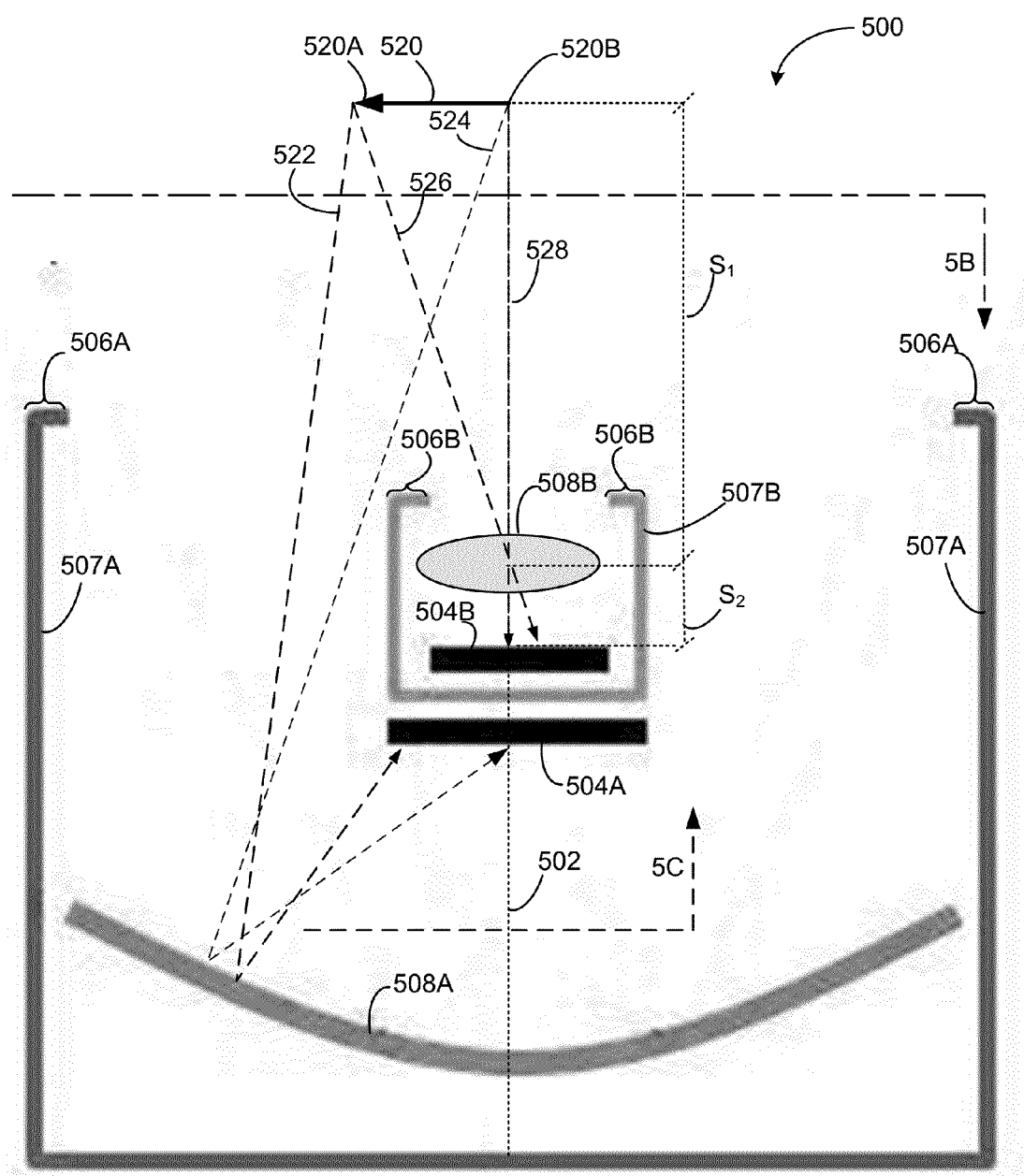
FIG. 5A illustrates a side view cross section of an example dual imaging system.

FIG. 5A illustrates a side view cross section of an example dual imaging system 500. The dual imaging system 500 includes a first imaging system comprising a first image sensor 504A, a first aperture stop 506A, a first wall 507A, and a first reflector 508A. The dual imaging system 500 also includes a second imaging system comprising a second image sensor 504B, a second aperture stop 506B, a second wall 507B, and a lens 508B. FIG. 5A further includes an object 520 with a first end 520A and a second end 520B, and light rays 522, 524, 526, and 528. Both the first and second image sensors 504A/504B may be configured to capture light travelling downward relative to the optical axis 502. Although, light captured by the first image sensor 504A may be reflected to travel upward before capture. Portions or components of the dual imaging system 500 may be arranged along, or around, a common optical axis 502.

It should be noted that dimensions of the imaging system 500 or the object 520 represented in FIG. 5A may not be to scale, and are for illustrative purposes only. It should also be noted that any depicted angles and/or directions of refraction or reflection depicted in FIG. 5A are purely for illustrative purposes and are not necessarily to scale.

The optical axis 502 may define an axis of rotational symmetry (or other axis of symmetry) for image sensors 504A and 504B, the aperture stops 506A and 506B, the lens 508B, the first reflector 508A, and the dual imaging system 500 as a whole. For example, a light ray such as the light ray 528 that travels along the optical axis 502 may pass through the lens 508B and reach the second image sensor 504B without being refracted (i.e. having its direction of travel changed).

The image sensors 504A and 504B may be configured to capture images of light incident upon the image sensors 504A and 504B and to provide data to a computing system (i.e. via an input/output interface) representing the respective captured images. The image sensors 504A and 504B may include a CMOS (complementary metal oxide semiconductor) sensor or a CCD (charge-coupled device) sensor, among other possibilities. The image sensors 504A and 504B may be aligned perpendicularly to the optical axis 502, but facing opposite directions. In this example, the first image sensor 504A may face downward while the second image sensor 504B may face upward.

The first wall 507A may provide structural support for the imaging system. Components of the dual imaging system 500 may be mounted (i.e. mechanically coupled) to bottom or side interior portions of the first wall 507A. The first reflector 508A may be mounted to a bottom or side portion of the first wall 507A. Structural descriptions included herein are included for illustrative purposes only. Other structural examples are possible.

The first image sensor 504A, the first aperture stop 506A, and the first reflector 508A may be configured to capture images of the object 520. For example, the light ray 522 may travel from the first end 520A of the object 520, past the second imaging system, and be reflected by the first reflector 508A and become incident upon the first image sensor 504A.

The first reflector 508A may be a curved section of glass coated with a smooth reflective metal layer on one or more surfaces, among other possibilities. The first reflector 508A may be a parabolic or concave reflector configured to reflect incident light rays toward a focus of the first reflector located above the first image sensor 504A. However, light rays may become incident upon the first image sensor 504A before the rays reach the focus of the first reflector 508A. The first reflector 508A may be symmetrically aligned along the optical axis 502 and located below the first image sensor 504A.

Similar to the light ray 522, the light ray 524 may travel from the second end 520B of the object 520, past the second imaging system, and be reflected by the first reflector 508A toward the first image sensor 504A. In this way, a real image of the object 520 is formed upon the first image sensor 504A. Rays of light that originate from a point on the optical axis 502 and travel past the second imaging system (such as light ray 524) may be reflected by the first reflector 508A to a point on the first image sensor 504A that is on the optical axis 502.

The first aperture stop 506A may surround a first aperture of the first imaging system and the second aperture stop 506B may surround a second aperture of the second imaging system. The second aperture may be located between the first aperture and the second image sensor 504B. Both the first aperture and the second aperture may be disc-shaped portions of planes respectively surrounded by the first and second aperture stops 506A and 506B. Light that reaches the first image sensor 504A may cross the first aperture while light that reaches the second image sensor 504B may cross the first and second apertures. The diameter of the first aperture may vary as the inner diameter of the first aperture stop 506A is varied.

In another sense, the first aperture stop 506A and the second aperture stop 506B may together define a third annular aperture corresponding to the first imaging system. Light that reaches the first image sensor 504A may cross the annular aperture. See FIG. 5B for more detail of the annular aperture. The aperture stops 506A and 506B may be adjustable so that the first and second image sensors 504A and 504B are configured to capture an image with a common viewpoint and/or with a common field of view.

The second imaging system, with respect to the optical axis 502, may be located radially within the first wall 507A of the first imaging system. The second imaging system could be located anywhere along the optical axis 502 with respect to the first imaging system. For example, the second aperture defined by the second aperture stop 506B could be located in front of, or behind, the first aperture defined by the first aperture stop 506A. Also, the second image sensor could be located in front of, or behind, the first aperture defined by the first aperture stop 506A.

The second image sensor 504B may be located at an image plane of the lens 508B that corresponds to the object 520. The location of the image plane of the lens 508B may be determined by equation 1, discussed above. In equation 1 and FIG. 5A, S1 may represent a distance between the object 520 and the lens 508B along the optical axis 502, S2 may represent a distance between the image plane (i.e. the second image sensor 504B) and the lens 508B along the optical axis 502, while f may represent a focal length of the lens 508B.

The lens 508B may be a piece of glass or other transparent material machined to focus light in accordance with embodiments disclosed herein. For example, the lens 508B may be configured to focus light incident upon the lens 508B to produce a real image of object 520 upon the second image sensor 504B. Two of the rays making up the real image of the object 520 are rays 526 and 528, which respectively represent the first end 520A and the second end 520B of the object 520.

The second aperture stop 506B may define a second aperture through which light may pass and be captured by the second image sensor 504B. The second aperture stop 506B may have a fixed diameter, or may be adjustable to create second apertures of varying diameters. The second aperture corresponding to the second aperture stop 506B may be a disc-shaped portion of a plane parallel to, and surrounded by, the second aperture stop 506B. In other embodiments, the second aperture stop 506B may define other shapes of apertures, such as a non-circular aperture. An adjustable second aperture stop 506B may also define a variable field of view of the second imaging system.

The second wall 507B may provide structural support for the dual imaging system (i.e. components of the dual imaging system may be mechanically coupled to the second wall 507B). For example, the second image sensor 504B may be mounted to a bottom portion of the second wall 507B and/or side portions of the second wall 507B. The lens 508B may be mounted to side portions of the second wall 507B. The second wall 507B may be mounted to a top, non-light-sensitive surface of the first image sensor 504A. Structural descriptions included herein are included for illustrative purposes only. Other structural examples are possible.

The lens 508B may be configured to refract light incident upon the lens 508B onto the second image sensor 504B so that the second image sensor 504B may capture images. The second image sensor 504B may lie along the image plane of the lens 508B.

Figure 5B:
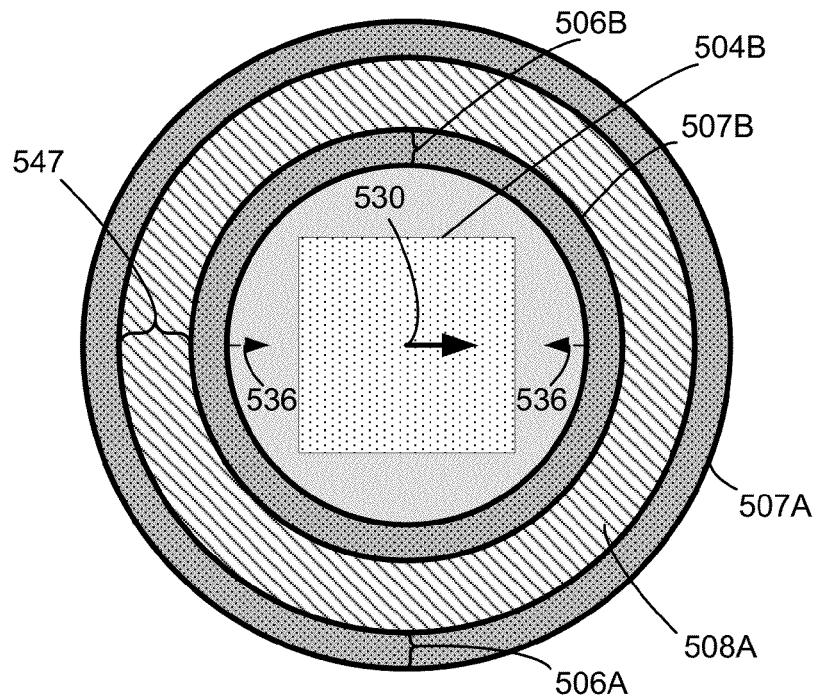
FIG. 5B is a downward view of portions of the example dual imaging system of FIG. 5A.

FIG. 5B is a downward view of portions of the example dual imaging system of FIG. 5A, including the second image sensor 504B, the first aperture stop 506A, the second aperture stop 506B, the first wall 507A, the second wall 507B, the first reflector 508A, and an image 550. The lens 508B is not shown in FIG. 5B.

As shown in FIG. 5B, the second image sensor 504B may be mechanically coupled to a structure that includes the second aperture stop 506B and the second wall 507B. The second aperture stop 506B may be configured to increase or decrease its inner diameter as shown at 536. Such changes in the inner diameter of the second aperture stop 506B may change an amount of light that reaches the second image sensor 504B and a field of view of the second imaging system. The image 530 of the object 520 (of FIG. 5A) may be made up of light rays 526 and 528 (of FIG. 5A), among other light rays. Toward the outer edge of the imaging system is the first aperture stop 506A. The first aperture stop 506A may also be adjustable and define an annular aperture 547 of the first imaging system, with an outer radius defined by the first aperture stop 506A and the inner radius defined by the second wall 507B or the second aperture stop 506B.

Figure 5C:
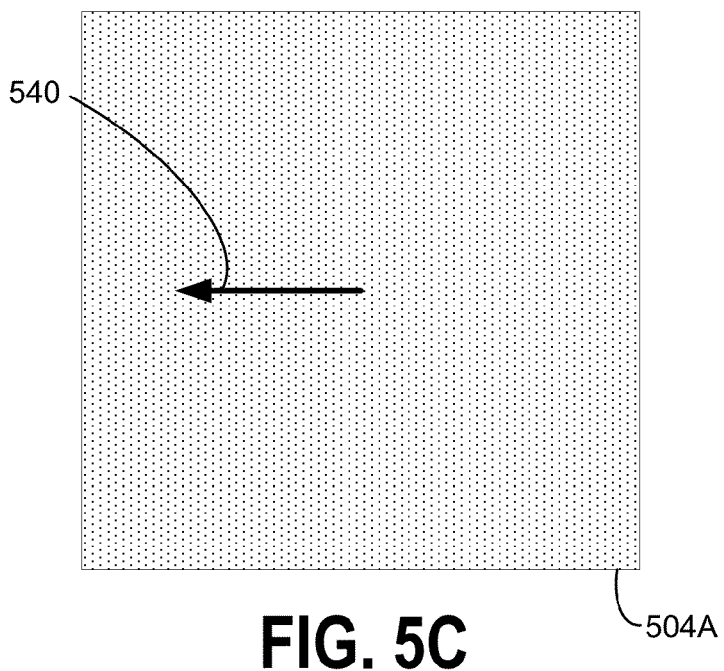
FIG. 5C illustrates an example image sensor of the system of FIG. 5A.

FIG. 5C illustrates an example image sensor of the system of FIG. 5A. FIG. 5C provides an upward looking view of the first image sensor 504A. In this example, light rays 522 and 524 (among other rays) have travelled from the object 520, past the second imaging system, and reflected off of the first reflector 508A such that the image 540 is formed on the first image sensor 504A.

Figure 5D:
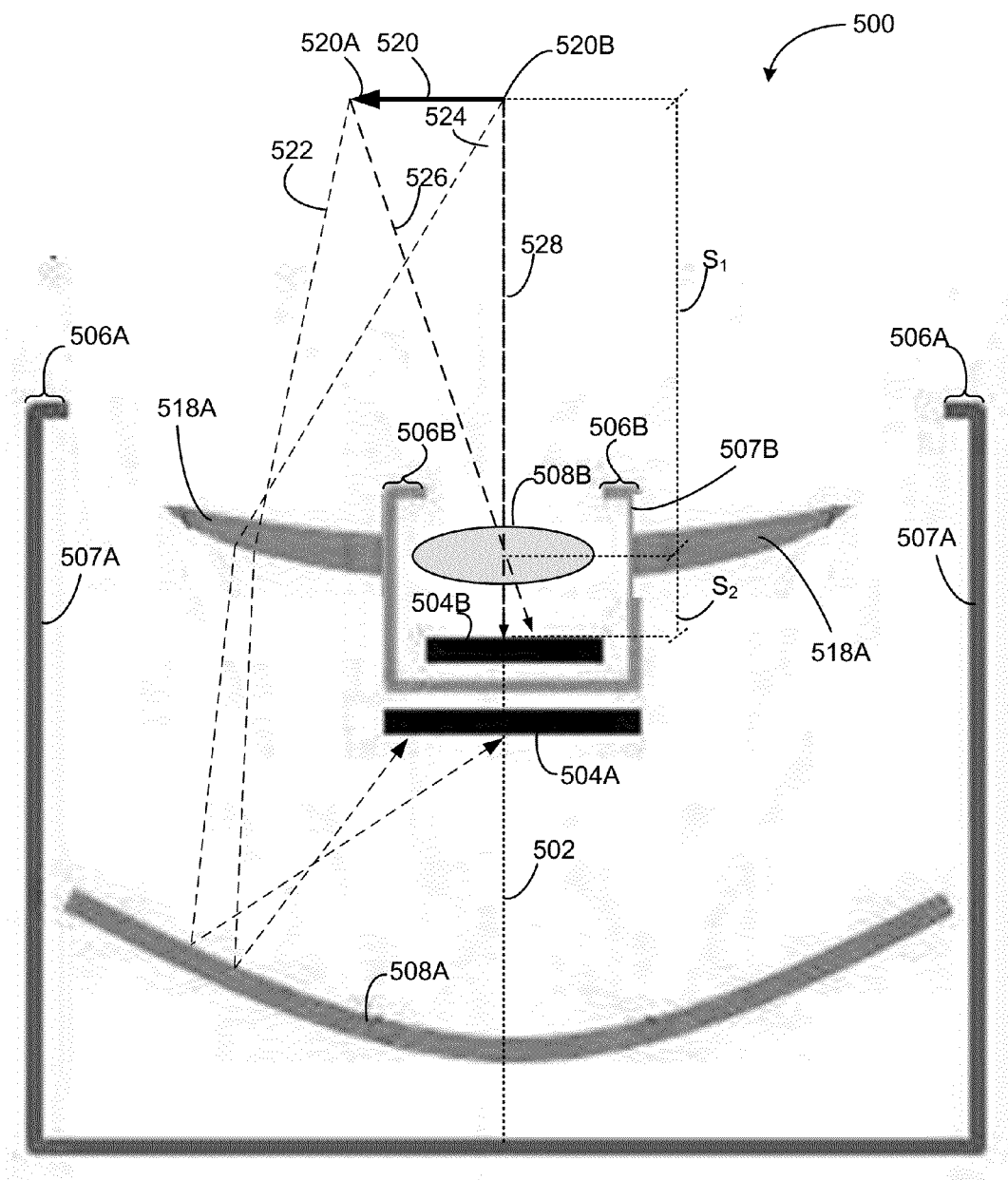
FIG. 5D illustrates a side view cross section of an example dual imaging system.

FIG. 5D illustrates a side view cross section of an example dual imaging system 500. The dual imaging system includes a first imaging system comprising a first image sensor 504A, a first aperture stop 506A, a first wall 507A, a first reflector 508A, and a lens 518A. The dual imaging system also includes a second imaging system comprising a second image sensor 504B, a second aperture stop 506B, and a second wall 507B. FIG. 5D further includes an object 520 with a first end 520A and a second end 520B, and light rays 522, 524, 526 and 528. The dual imaging system of FIG. 5D may be similar to the system depicted in FIG. 5A, however the dual imaging system of FIG. 5D may include the lens 518A as an additional optical element. The lens 518A may have functionality similar to that of the lens 408A described below with regard to FIG. 4A.

Figure 6A:
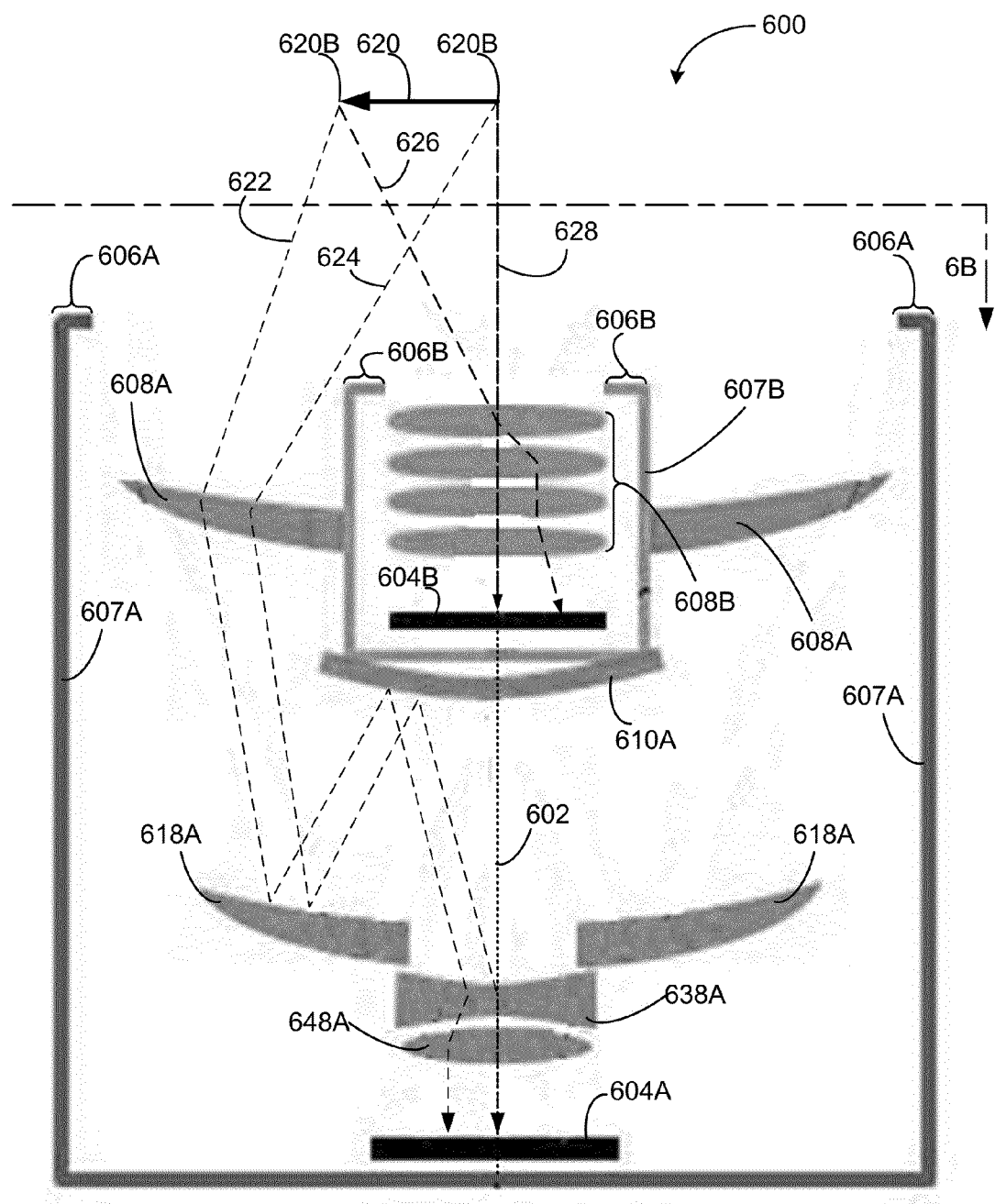
FIG. 6A illustrates a side view cross section of an example dual imaging system.

FIG. 6A illustrates a side view cross section of an example dual imaging system 600. The dual imaging system includes a first imaging system comprising a first image sensor 604A, a first aperture stop 606A, a first wall 607A, a lens 608A, a first reflector 618A, a second reflector 610A, and lenses 638A and 648A. The dual imaging system also includes a second imaging system comprising a second image sensor 604B, a second aperture stop 606B, a second wall 607B, and a plurality of lenses 608B. FIG. 6A further includes an object 620 with a first end 620A and a second end 620B, and light rays 622, 624, 626 and 628. Both the first and second image sensors 604A and 604B may face upward and be configured to capture light travelling downward relative to the optical axis 602. Portions or components of the dual imaging system 600 may be arranged along, or around, a common optical axis 602.

It should be noted that dimensions of the imaging system 600 or the object 620 represented in FIG. 6 may not be to scale, and are for illustrative purposes only. It should also be noted that any depicted angles and/or directions of refraction or reflection depicted in FIG. 6 are purely for illustrative purposes and are not necessarily to scale.

The optical axis 602 may define an axis of rotational symmetry (or other axis of symmetry) for the image sensors 604A and 604B, the aperture stops 606A and 606B, the plurality of lenses 608B, the lens 608A, the first reflector 618A, the second reflector 610A, the lenses 638A and 648A, and the dual imaging system 600 as a whole. For example, a light ray such as the light ray 628 that travels along the optical axis 602 may pass through the plurality of lenses 608B and reach the second image sensor 604B without being refracted (i.e. having its direction of travel changed).

The image sensors 604A and 604B may be configured to capture images of light incident upon the image sensors 604A and 604B and to provide data to a computing system (i.e. via an input/output interface) representing the respective captured images. The image sensors 604A and 604B may include a CMOS (complementary metal oxide semiconductor) sensor or a CCD (charge-coupled device) sensor, among other possibilities. The image sensors 604A and 604B may be aligned perpendicularly to the optical axis 602 facing upward with respect to the optical axis 602.

The first wall 607A may provide structural support to the dual imaging system 600. Components of the dual imaging system 600 may be mounted (i.e. mechanically coupled) to bottom or side interior portions of the first wall 607A. Components of the first imaging system, such as the lenses 608A, 638A, and 648A, the first reflector 618A, and the second reflector 610A may also be mounted to a bottom or side portion of the first wall 607A. Structural descriptions included herein are included for illustrative purposes only. Other structural examples are possible.

The first image sensor 604A, the first aperture stop 606A, the lenses 608A, 638A, and 648A, the first reflector 618A, and the second reflector 610A may be configured to capture images of the object 620. For example, the light ray 622 may travel from the first end 620A of the object 620, be refracted by the lens 608A, travel past the second imaging system, be reflected sequentially by the first reflector 618A and the second reflector 610A, be refracted by the lenses 638A and 648A, and become incident upon the first image sensor 604A.

The reflectors 618A and 610A may be curved sections of glass or other material coated with a smooth reflective metal layer on one or more surfaces, among other possibilities. The reflectors 618A and 610A may also be dual purpose reflector/refractors, each having a front refractive element and a back reflective surface. For example, light may be refracted through the front refractive element, be reflected by the back reflective surface, and be refracted by the front refractive element as the light passes through the refractive element again. The lenses 608A, 638A, and 648A may be pieces of glass or other translucent material machined to focus light in accordance with embodiments disclosed herein.

Similar to the light ray 622, the light ray 624 may travel from the second end 620B of the object 620, be refracted by the lens 608A, travel past the second imaging system, be reflected sequentially by the first reflector 618A and the second reflector 610A, be refracted by the lenses 638A and 648A, and become incident upon the first image sensor 604A. In this way, a real image of the object 620 is formed upon the first image sensor 604A. Note that rays of light that originate from a point on the optical axis 602 and travel past the second imaging system (such as light ray 624) may be redirected by the first imaging system to a point on the first image sensor 604A that is on the optical axis 602.

The first aperture stop 606A may surround a first aperture of the first imaging system and the second aperture stop 606B may surround a second aperture of the second imaging system. The second aperture may be located between the first aperture and the second image sensor 604B. (In other examples, the first aperture may be located between the second aperture and the second reflector 610A.) Both the first aperture and the second aperture may be disc-shaped portions of planes respectively surrounded by the first and second aperture stops 606A and 606B. Light that reaches the first image sensor 604A may cross the first aperture while light that reaches the second image sensor 604B may cross the first and second apertures. The diameter of the first aperture may vary as the inner diameter of the first aperture stop 606A is varied.

In another sense, the first aperture stop 606A and the second aperture stop 606B may together define a third annular aperture corresponding to the first imaging system. Light that reaches the first image sensor 604A may cross the annular aperture. See FIG. 6B for more detail of the annular aperture. The aperture stops 606A and 606B may be adjustable so that the first and second image sensors 604A and 604B are configured to capture an image with a common viewpoint and/or with a common field of view.

The second imaging system, with respect to the optical axis 602, may be located radially within the first wall 607A of the first imaging system. The second imaging system could be located anywhere along the optical axis 602 with respect to the first imaging system. For example, the second aperture defined by the second aperture stop 606B could be located in front of, or behind, the first aperture defined by the first aperture stop 606A. Also, the second image sensor could be located in front of, or behind, the first aperture defined by the first aperture stop 606A.

The second image sensor 604B may be located at an image plane of the plurality of lenses 608B that corresponds to the object 620. For example, the plurality of lenses 608B may be configured to focus light incident upon the plurality of lenses 608B to produce a real image of object 620 upon the second image sensor 604B. Two of the rays making up the real image of the object 620 are rays 626 and 628, which respectively represent the first end 620A and the second end 620B of the object 620.

The second aperture stop 606B may define a second aperture through which light may pass and be captured by the second image sensor 604B. The second aperture stop 606B may have a fixed diameter, or may be adjustable to create second apertures of varying diameters. The second aperture corresponding to the second aperture stop 606B may be a disc-shaped portion of a plane parallel to, and surrounded by, the second aperture stop 606B. In other embodiments, the second aperture stop 606B may define other shapes of apertures, such as a non-circular aperture. An adjustable second aperture stop 606B may define a variable field of view of the second imaging system. In this example, the second aperture is located between the first aperture and the second image sensor 604B.

The second wall 607B may provide structural support for the dual imaging system (i.e. components of the dual imaging system may be mechanically coupled to the second wall 607B). For example, the second image sensor 604B may be mounted to a bottom portion of the second wall 607B and/or side portions of the second wall 607B. The plurality of lenses 608B may be mounted to side portions of the second wall 607B. The second wall 607B may be mounted to a top, non-light sensitive surface of the second reflector 610A. Structural descriptions included herein are included for illustrative purposes only. Other structural examples are possible.

The plurality of lenses 608B may be configured to refract light incident upon the plurality of lenses 608B onto the second image sensor 604B so that the second image sensor 604B may capture images. The second image sensor 604B may lie along an image plane of the plurality of lenses 608B corresponding to the object 620.

Figure 6B:
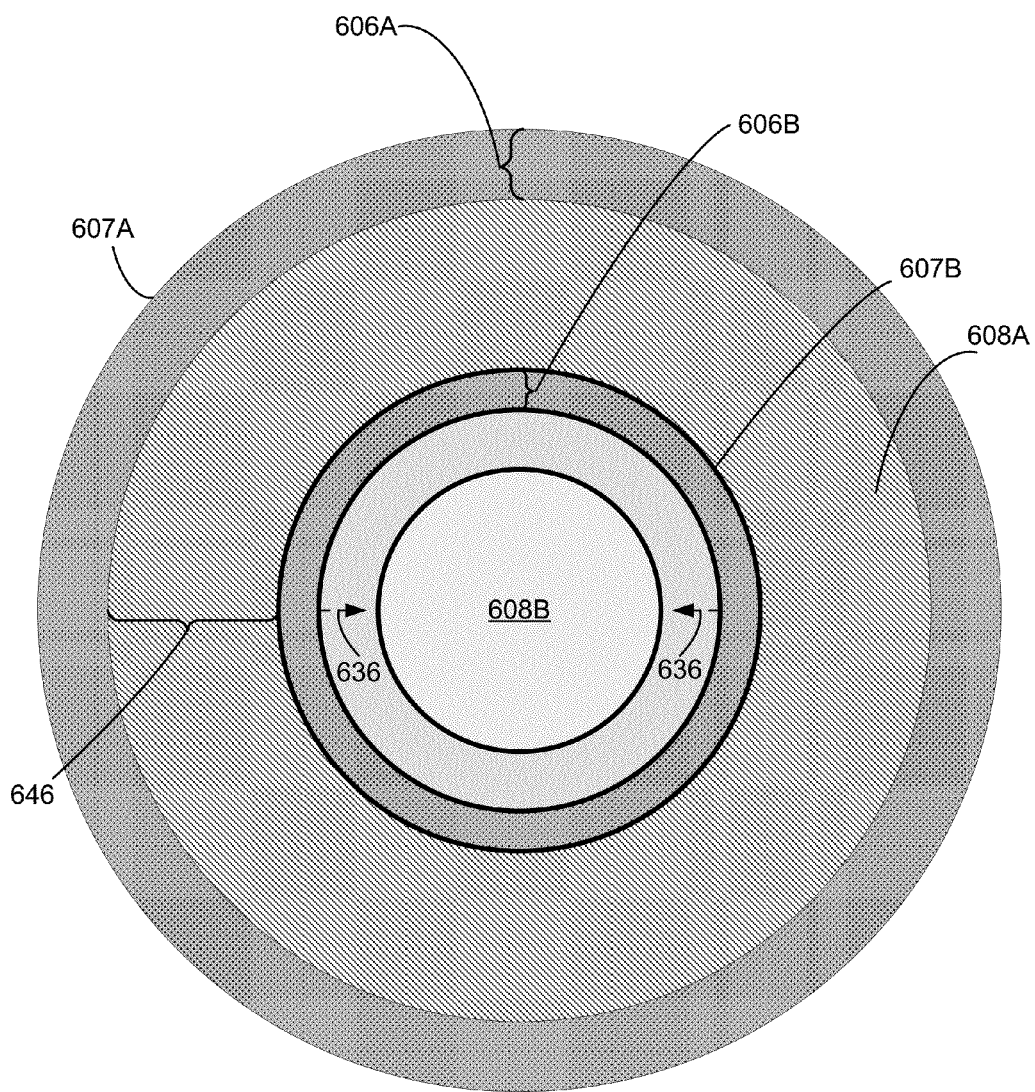
FIG. 6B illustrates a downward looking view of the example dual imaging system of FIG. 6A.

FIG. 6B illustrates a downward looking view of the example dual imaging system of FIG. 6A, including the plurality of lenses 608B, the first aperture stop 606A, the second aperture stop 606B, the first wall 607A, the second wall 607B, and the lens 608A. The plurality of lenses 608B may be mechanically coupled to a bottom or side portion of the second wall 607B. The second aperture stop 606B may be configured to increase or decrease its inner diameter to increase or decrease a size of the second aperture, as shown at 636. The first aperture stop 606A may be configured to increase or decrease its inner diameter to increase or decrease a size of the annular aperture 646 and the first aperture. The lens 608A may be mounted to an exterior of the second wall 607B, or may be mounted to an interior of the first wall 607A. Other examples are possible.

Figure 7A:
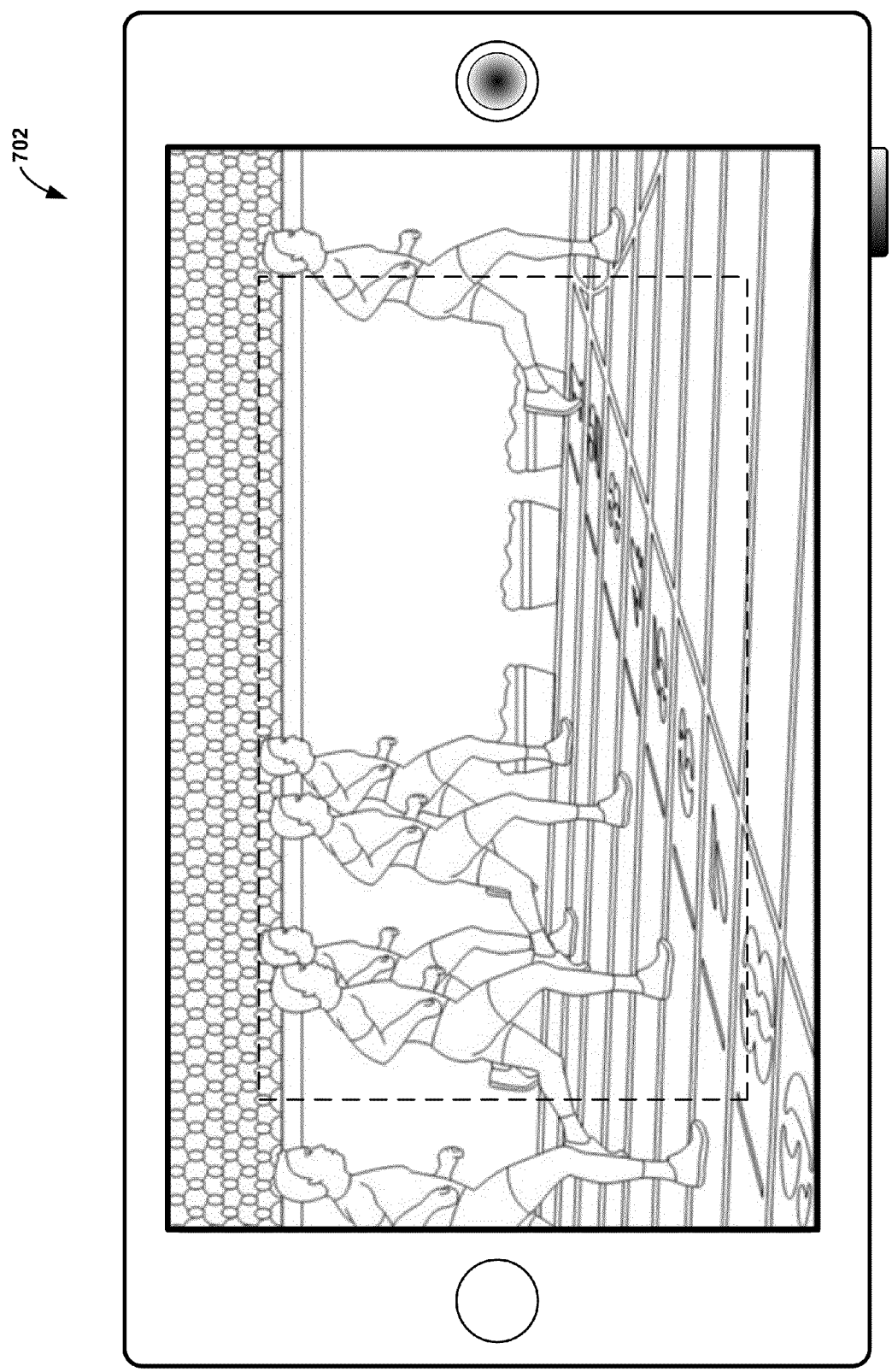
FIG. 7A illustrates a first image frame captured by a first camera of an imaging system.

FIG. 7A illustrates a first image frame 702 captured by a first (wide-view) camera of an imaging system. The first image frame (or a representation thereof) may be displayed in a live-view interface of a display of the imaging system. The imaging system may also include a second camera having a narrower second field of view than that of the first field of view of the first camera. The first and second cameras may be configured to capture images of the same environment simultaneously. The first image frame 702 may have a pixel resolution equal to a pixel resolution of an image sensor of the first camera. In some situations, a user of the imaging system may desire to view a zoomed-in image frame corresponding to a field of view narrower than the field of view represented by the first image frame 702.

For example, the user may wish to view an image frame that corresponds with the narrower field of view of the second camera. In this case, the user may touch a designated area of a touchscreen display indicating that the imaging system should display a zoomed-in image frame, or provide such an input in another way. Instead of instantaneously switching the live-view interface to display image frames captured by the second camera, the live-view interface may display a transitional field of view that facilitates a transition from the wide field of view of the first camera to the narrower field of view of the second camera. To accomplish this transition, the imaging system may perform image processing methods described below with the image frame(s) captured by the first and second cameras.

Figure 7B:
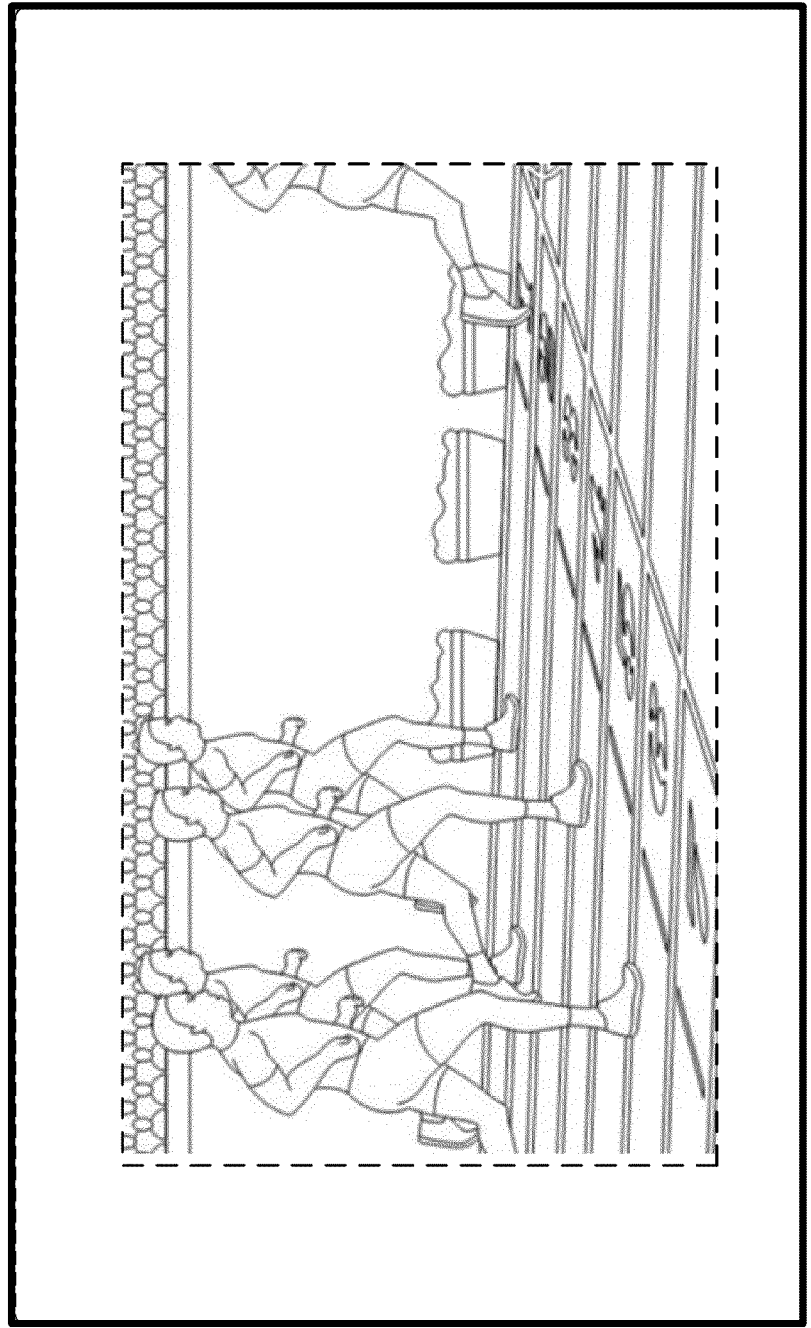
FIG. 7B illustrates a cropped image frame representing the first image frame of FIG. 7A after the first image frame has been cropped.

FIG. 7B illustrates a cropped image frame 704 representing the first image frame 702 of FIG. 7A after the first image frame 702 has been cropped to represent a field of view narrower than the first field of view. As can be seen when comparing FIGS. 7A and 7B, a border region of the first image frame 702 has been removed and, as a result, a pixel resolution of the cropped image frame 704 is less than a pixel resolution of the first image frame 702.

Figure 7C:
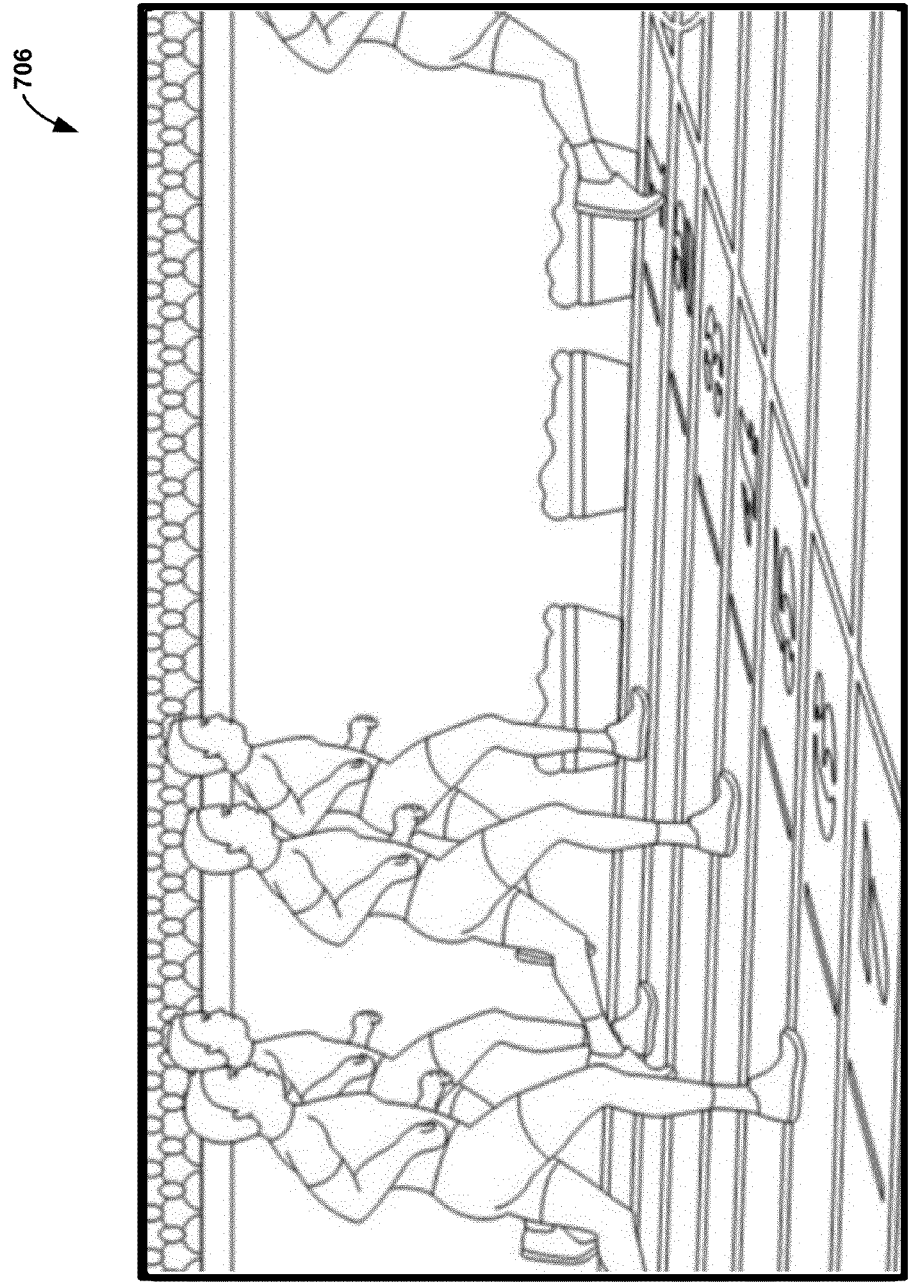
FIG. 7C illustrates an expanded image frame representing the cropped image frame of FIG. 7B after the cropped image frame has been expanded.

FIG. 7C illustrates an expanded image frame 706 representing the cropped image 704 after the cropped image frame 704 has been expanded. The expanded image frame 706 may have a pixel resolution equal to that of the first image frame 702 even though the expanded image frame 706 may represent less visual information than the first image frame 702. Also, due to the cropping step described above relating to FIG. 7B, a field of view represented by the expanded image frame 706 is narrower than the field of view represented by the first image frame 702.

Figure 7D:
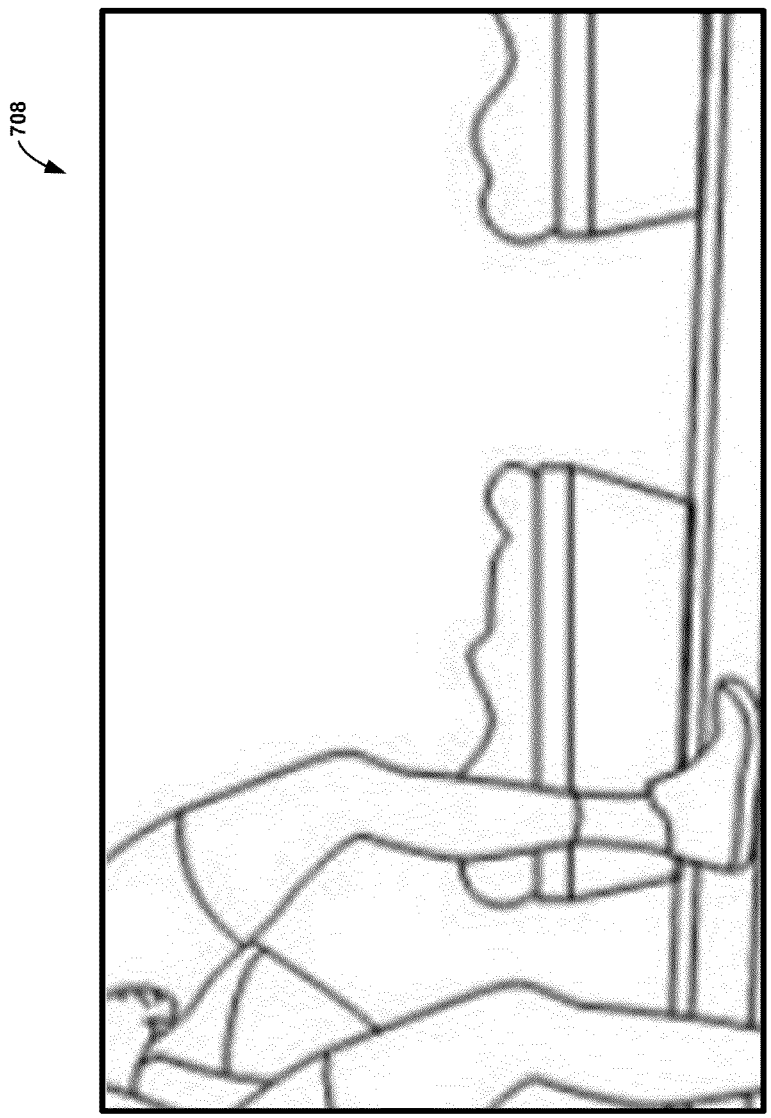
FIG. 7D illustrates a second image frame captured by the second camera of the imaging system.

FIG. 7D illustrates a second image frame 708 captured by the second (narrow-view) camera of the imaging system. The second image frame 708 may have a pixel resolution equal to the pixel resolution of the first image frame 702, however a field of view represented by the second image frame 708 may be narrower than the field of view represented by the first image frame 702.

FIG. 7E illustrates a reduced image frame 710 representing the second image frame 708 after the second image frame 708 has been reduced or compressed. The reduced image frame 710 may represent a field of view equal to that of the second image frame 708, however a pixel resolution of the reduced image frame 710 may be less than the pixel resolution of the second image frame 708. The reduced image frame 710 may also represent less visual information than the second image frame 708.

Figure 7F:
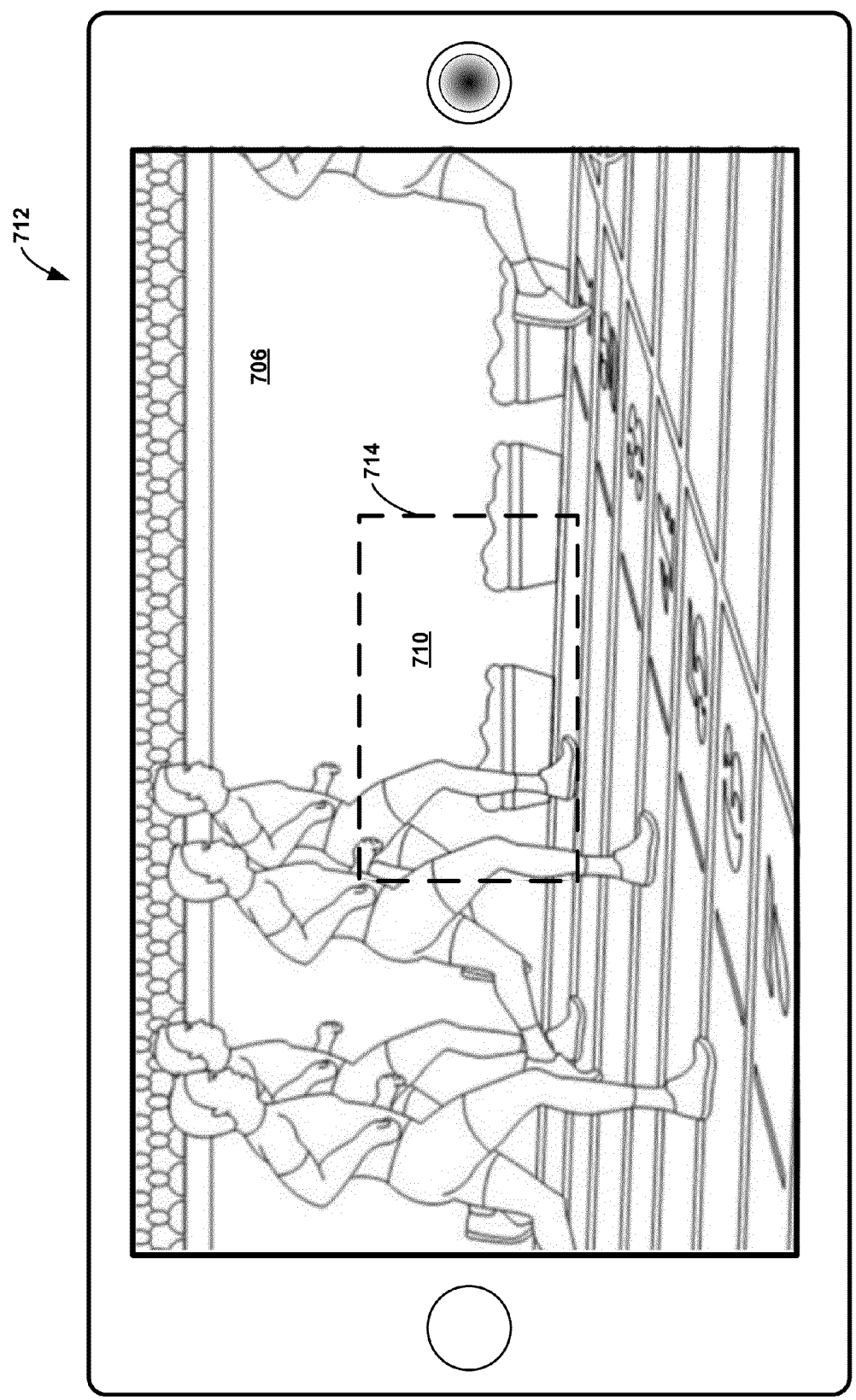
FIG. 7F illustrates a composite image frame generated by overlaying the reduced image frame of FIG. 7E onto the expanded image frame of FIG. 7C.

FIG. 7F illustrates a composite image frame 712 generated by overlaying the reduced image frame 710 onto the expanded image frame 706. The composite image frame 712 may represent a field of view that is narrower than the first field of view (i.e. the first image frame 702) but wider than the second field of view (i.e. the second image frame 708). The composite image frame 712 may also have a pixel resolution equal to respective pixel resolutions of the first image frame 702 and the second image frame 708. The composite image frame 712 may be displayed in the live-view interface as part of a visual effect that transitions the live-view interface from displaying the wider first field of view to displaying the narrower second field of view. The composite image 712 includes a stitching boundary 714 that represents a boundary between the reduced image frame 710 and the expanded image frame 706 that together make up the composite image frame 712.

Figure 7G:
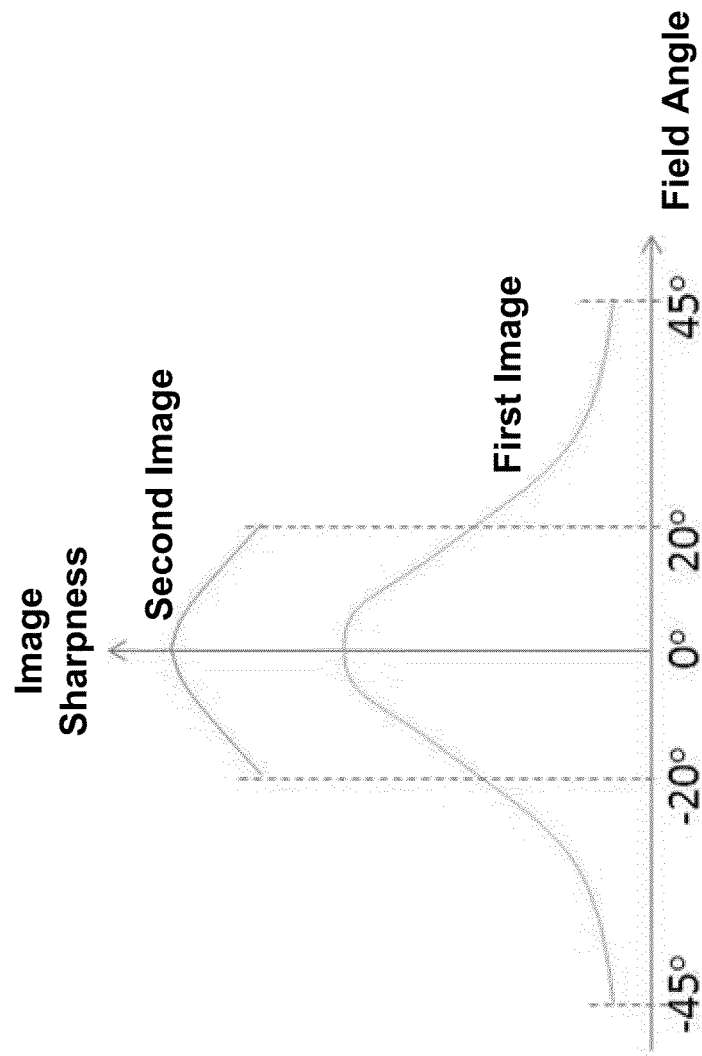
FIG. 7G illustrates relative image sharpness of a first image captured by a wide-angle first camera and a second image captured by a narrow-angle second camera, as a function of field angle.

FIG. 7G illustrates relative image sharpness of a first image captured by the wide-angle first camera and a second image captured by the narrow-angle second camera, as a function of field angle. Both cameras may be a part of a common imaging system and a difference in relative image sharpness between the first and second images may be caused by inherent optical characteristics of narrow-field and wide-field lensing systems. As can be seen from FIG. 7G, the image sharpness of the second (narrow-angle) image is sharper than the first (wide-angle) image at all shared field angles. The sharpness of the first image and the sharpness of the second image may both have a maximum at 0°, which may correspond to a common optical axis of the imaging system. Both the sharpness of the first image and the sharpness of the second image may decrease as the absolute value of the field angle increases. A greater absolute field angle generally corresponds with pixels that are farther from a center of the first or second image. Angles depicted in FIG. 7G are arbitrary and included for example purposes only.

Figure 7H:
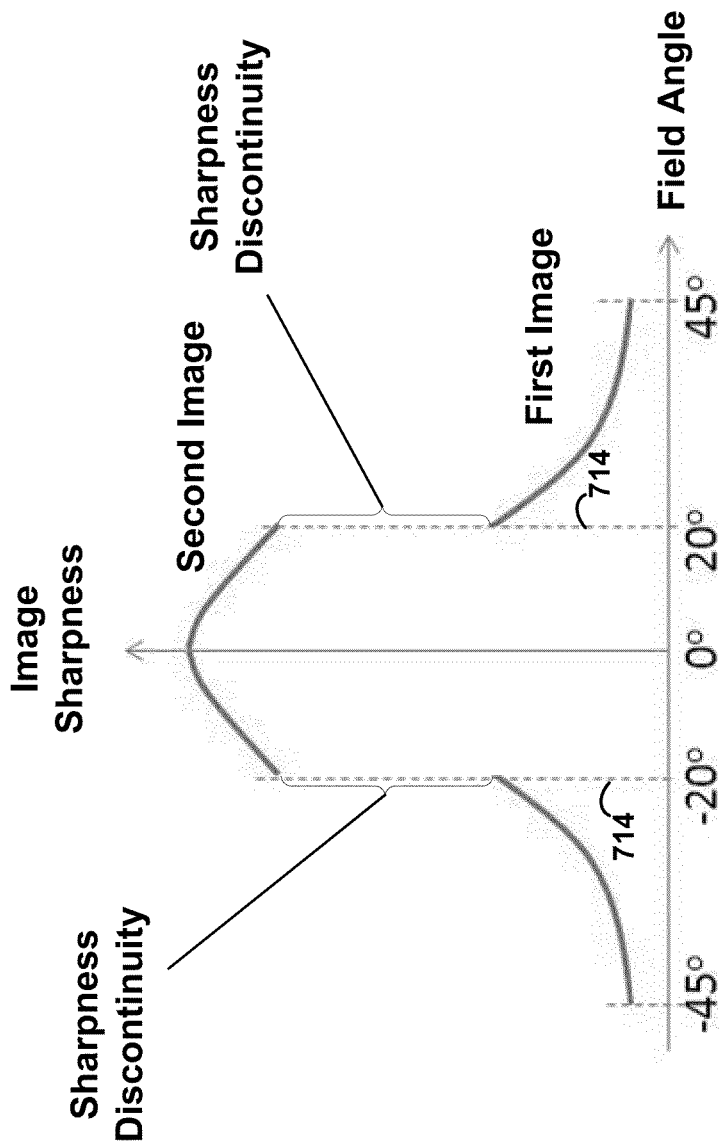
FIG. 7H illustrates relative image sharpness of a portion of the first image and a portion of the second image of FIG. 7G, as a function of field angle.

FIG. 7H illustrates relative image sharpness of a portion of the first image and a portion of the second image of FIG. 7G, as a function of field angle. The sharpness of the first image may represent a sharpness of a portion of the expanded image frame 706 of FIG. 7F (i.e. a border portion of the composite image frame 712) and the second image may represent a sharpness of the reduced image frame 710 of FIG. 7F (i.e. a center portion of the composite image frame 712). As shown, there may be a sharpness discontinuity at the stitching boundary 714 when the reduced image frame 710 is overlaid upon the expanded image frame 706.

Figure 7I:
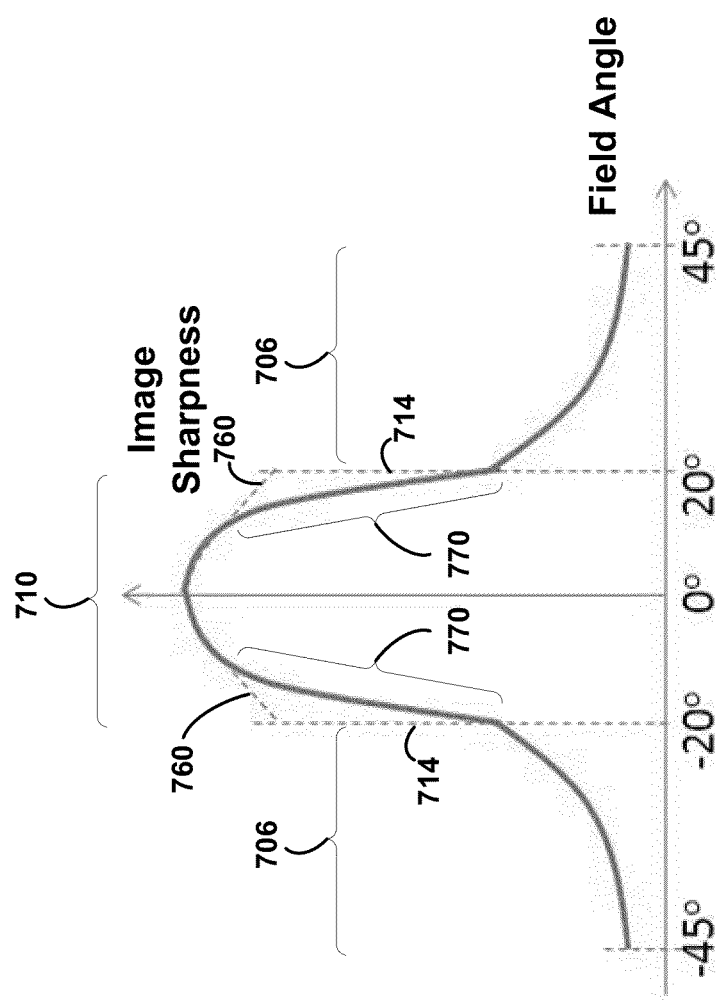
FIG. 7I illustrates a sharpness of a composite image frame as a function of field angle.

FIG. 7I illustrates a sharpness of a composite image frame as a function of field angle, such as the composite image frame 712 of FIG. 7F. For example, the composite image frame 712 is made up of the reduced image frame 710 overlaid upon the expanded image frame 706 of FIG. 7F. As shown in FIG. 7I, blurring techniques have been performed on the reduced image frame 710 to create a gradual transition of image sharpness between the reduced image frame 710 and the expanded image frame 706. For instance, a dashed line 760 represents a sharpness of the reduced image frame 710 near the stitching boundary 714 prior to blurring techniques being performed on the reduced image frame 710. A solid curve 770 represents a sharpness of the reduced image frame 710 after blurring techniques have been performed on the reduced image frame 710. As depicted in FIG. 7I, at least some sharpness discontinuities between the reduced image frame 710 and the expanded image frame 706 have been mitigated to some degree.

Figure 7J:
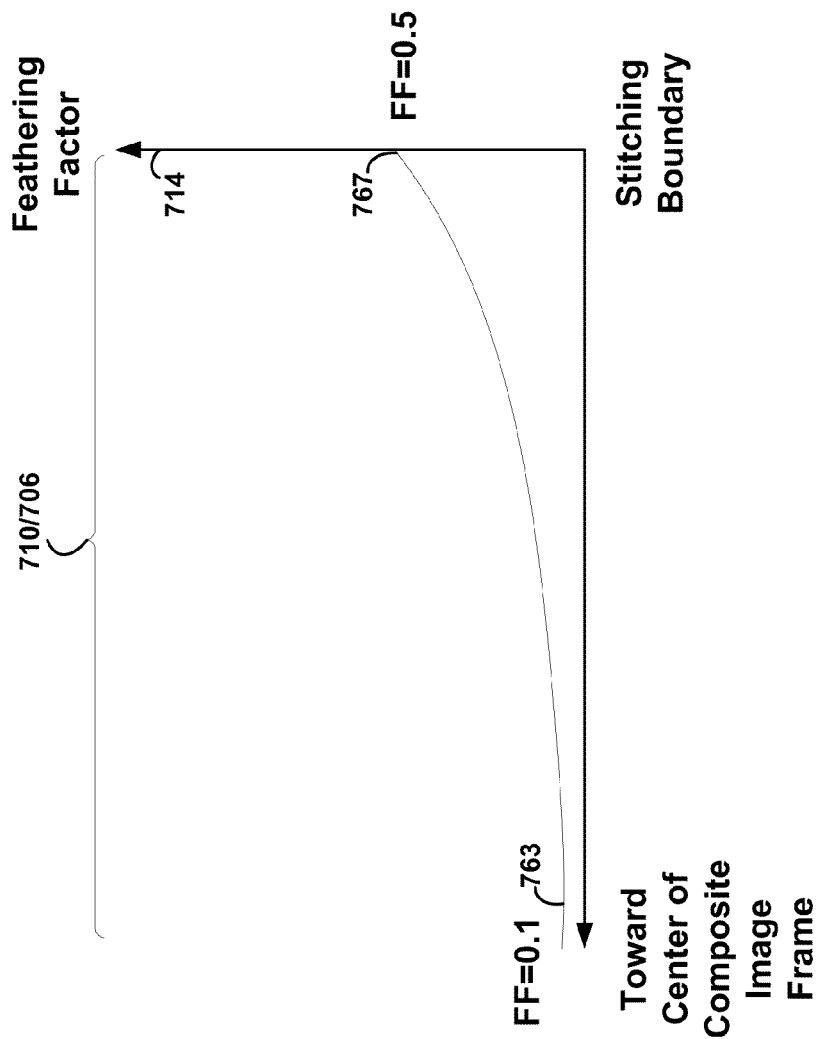
FIG. 7J illustrates an example feathering algorithm performed on a composite image frame.

FIG. 7J illustrates an example feathering algorithm performed on a composite image frame, such as the composite image frame 712 of FIG. 7F. Along with pixel blurring techniques described above, pixel feathering techniques may also be useful in making the stitching boundary 714 less visually apparent in the composite image frame 712. One feathering technique may include generating a composite image frame 712 by incorporating brightness or color information from both corresponding pixels of the reduced image frame 710 and the expanded image frame 706 of FIG. 7F via equations 1, 2, 3, or 4:

$$\text{Brightness}_{CIF} = B_R * (1 - FF) + FF * B_E \quad [1]$$

$$\text{Red}_{CIF} = \text{Red}_R * (1 - FF) + FF * \text{Red}_E \quad [2]$$

$$\text{Green}_{CIF} = \text{Green}_R * (1 - FF) + FF * \text{Green}_E \quad [3]$$

$$\text{Blue}_{CIF} = \text{Blue}_R * (1 - FF) + FF * \text{Blue}_E \quad [4]$$

Equation 1 could be used if the composite image frame 712 being generated is a grayscale image. Equation 1 describes a weighted average of brightness values of corresponding respective pixels of the expanded image frame 706 and the reduced image frame 710. For example, consider pixel 763 which is located far within the stitching boundary 714. According to the algorithm, a feathering factor (FF) to be applied at pixel 763 may be 0.1. As an example, a brightness value of the pixel 763 may be 50% ($B_E$) on the expanded image frame 706 and 70% ($B_R$) on the reduced image frame 710, yielding a brightness value of 68% for the pixel 763 of the composite image frame 712 ($\text{Brightness}_{oF} = 0.7*(1-0.1) + 0.1*0.5 = 68\%$). Accordingly, since the pixel 763 lies much closer to the center than the stitching boundary 714, the algorithm determines the brightness of the pixel 763 of the composite image frame 712 to have a value that is much closer to the brightness (70%) of the pixel 763 of the reduced image frame 710 rather than the brightness (50%) of the pixel 763 of the expanded image frame 706.

Similarly at pixel 767 along the stitching boundary 714, the feathering algorithm may result in a brightness value of 60% ($\text{Brightness}_{CIF} = 0.7*(1-0.5) + 0.5*0.5 = 60\%$). According to the algorithm, pixels of the composite image frame 712 that lie on the stitching boundary 714 will have a brightness equal to an unweighted average of the brightness of corresponding pixels of the expanded image frame 706 and the reduced image frame 710.

The algorithm may similarly determine red, green, and blue color values for pixels of the composite image frame 712 using equations 2-4. For example, on an 8-bit color scale of 0-256, pixel 763 of the reduced image frame 710 may have a blue color value of 150 while pixel 763 of the expanded image frame 706 may have a blue color value of 200. According to the algorithm, the blue color value of pixel 763 of the composite image frame 712 is determined to be 155 ($\text{Blue}_{CIF} = \text{Blue}_R*(1-FF) + FF*\text{Blue}_E = 150*(1-0.1) + 0.1*200) = 155$). Since the pixel 763 is much closer to the center of the composite image 712 than the stitching boundary 714, it takes on a blue color value closer to that of the reduced image frame 710 than that of the expanded image frame 706. On the other hand, pixel 767 of the composite image frame 712 may have a blue value of 175 ($\text{Blue}_{CIF} = \text{Blue}_R*(1-FF) + FF*\text{Blue}_E = 150*(1-0.5) + 0.5*200) = 175$). Since the pixel 767 is on the stitching boundary 714, the pixel 767 takes on a blue color value equally weighted between that of the expanded image frame 706 and the reduced image frame 710. Red and green color weighting of pixels of the composite image frame 712 are generated in a similar manner using equations 2 and 3. Feathering factors provided for pixels 763 and 767 are arbitrary and included as examples only.

Figure 8A:
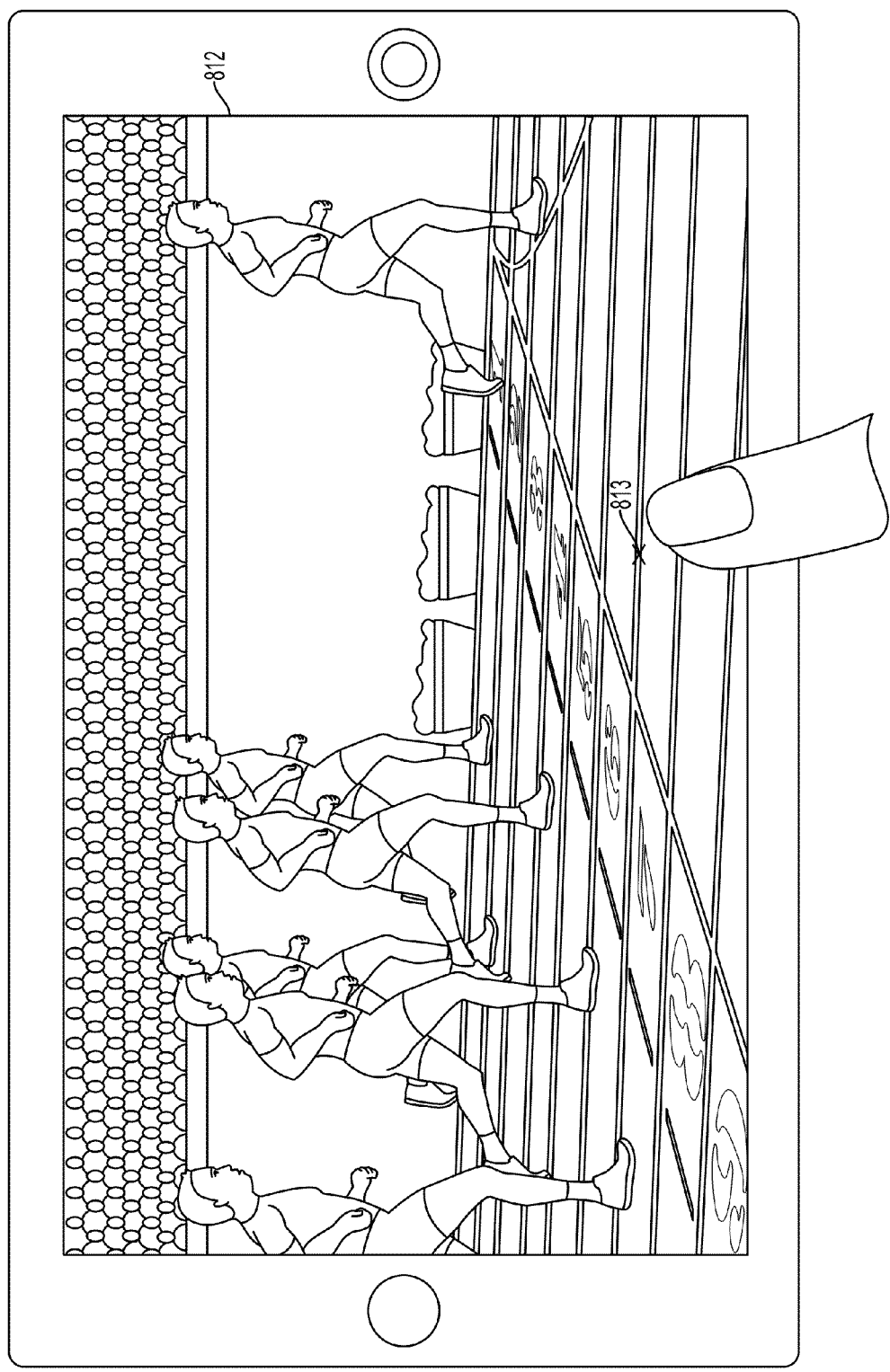
FIG. 8A illustrates a first image frame displayed by a live-view interface of a display of an imaging system.

FIG. 8A illustrates a first image frame 812 displayed by a live-view interface of a display of an imaging system. The first image frame 812 may represent a first image stream being captured in real-time by a first camera of the imaging system having a first field of view. An image frame being displayed in the live-view interface may be generated by compressing an image frame of an image stream or by sampling images of an image stream. That is, certain image frames of image streams to be displayed within the live-view interface may be "skipped" to conserve computational resources, so that a display frame rate of the live-view interface is less than a capture frame rate of the image stream represented in the live-view interface.

As the first image frame 812 is being displayed within the live-view interface, the user may provide input 813 indicating that the live-view interface should transition to displaying a second image stream captured by a second camera of the imaging system having a second field of view that is narrower than the first field of view.

Figure 8B:
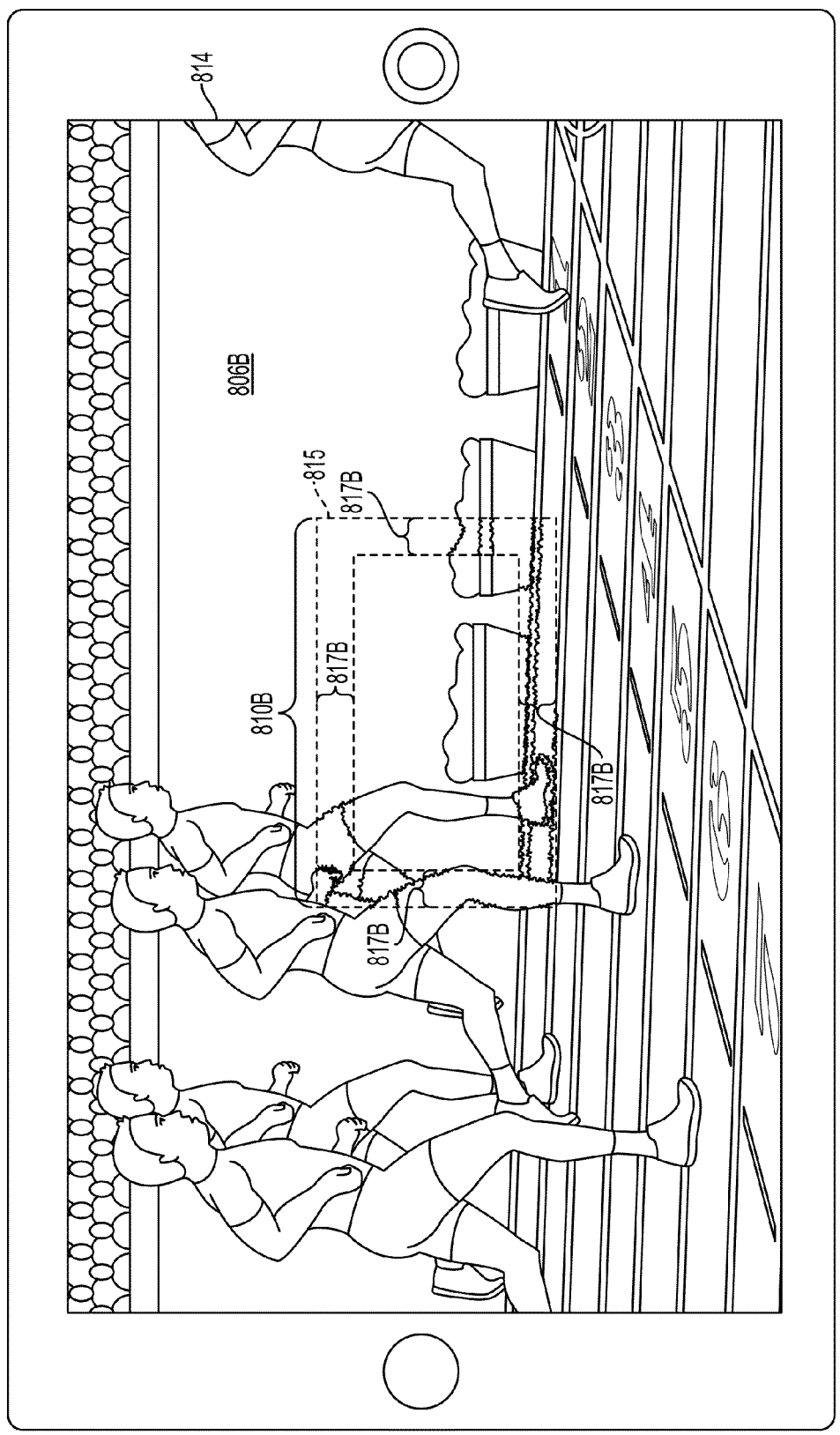
FIG. 8B illustrates a composite image frame representing a first image stream captured by a first camera and a second image stream captured by a second camera.

In response to receiving the input, the imaging system may perform image processing steps described above to image frames of the first and second image streams. For instance, FIG. 8B illustrates a composite image frame 814 made up of an expanded image frame 806B representing the first image stream and a reduced image frame 810B representing the second image stream. A stitching boundary 815 may represent a boundary between the reduced image frame 810B and the expanded image frame 806B that make up the composite image frame 814. The composite image frame 814 represents a narrower field of view than that of the first image frame 812. In this way the live-view interface begins to transition from displaying a wide-angle first image frame 812 to displaying a narrower field of view represented by the composite image frame 814. In one aspect, composite images such as the composite image 814 could represent a transitional field of view that is displayed in the live-view display between display of the first field of view and the second field of view. Note, that in FIG. 8B (and in FIGS. 8C and 8D) an entire image frame of the second image stream is displayed in the live-view interface while only a portion of an image frame of the first image stream is displayed in the live-view interface. Blurring techniques, such as those depicted in FIG. 7I, may be applied to the composite image frame 814 as shown at a blurred region 817B that lies within and near the stitching boundary 815.

Figure 8C:
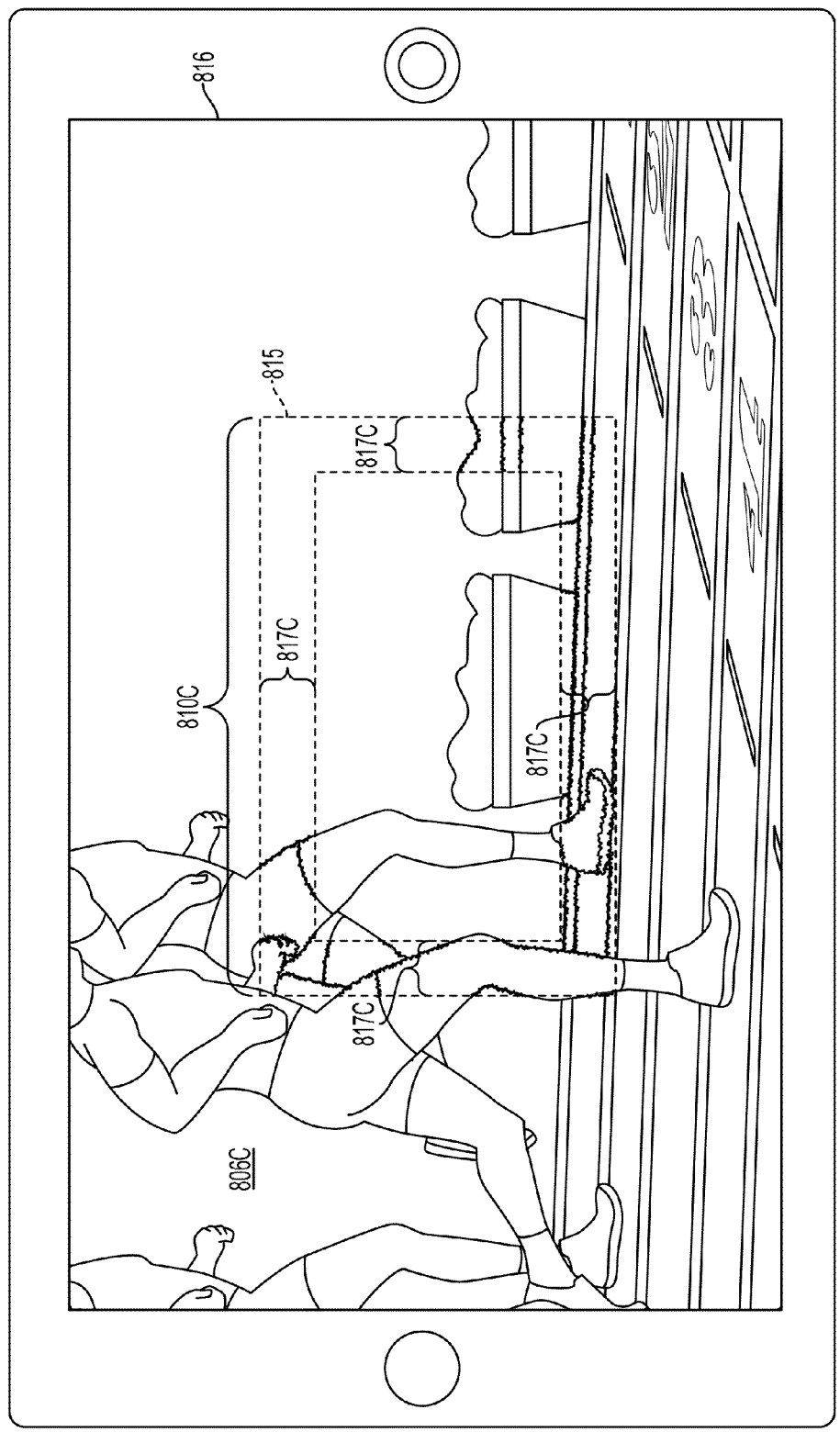
FIG. 8C illustrates a composite image frame representing a first image stream captured by a first camera and a second image stream captured by a second camera.

The transition between the live-view interface displaying the first image stream and the second image stream is further illustrated in FIG. 8C. When compared to the composite image frame 814, the field of view of the composite image frame 816 is even narrower. As compared to the reduced image frame 810B and the expanded image frame 806B, the reduced image frame 810C makes up a larger proportion of the composite image frame 816 and the expanded image frame 806C makes up a smaller proportion of the composite image frame 816. Blurring techniques, such as those depicted in FIG. 7I, may be applied to the composite image frame 816 as shown at a blurred region 817C that lies within and near the stitching boundary 815.

Figure 8D:
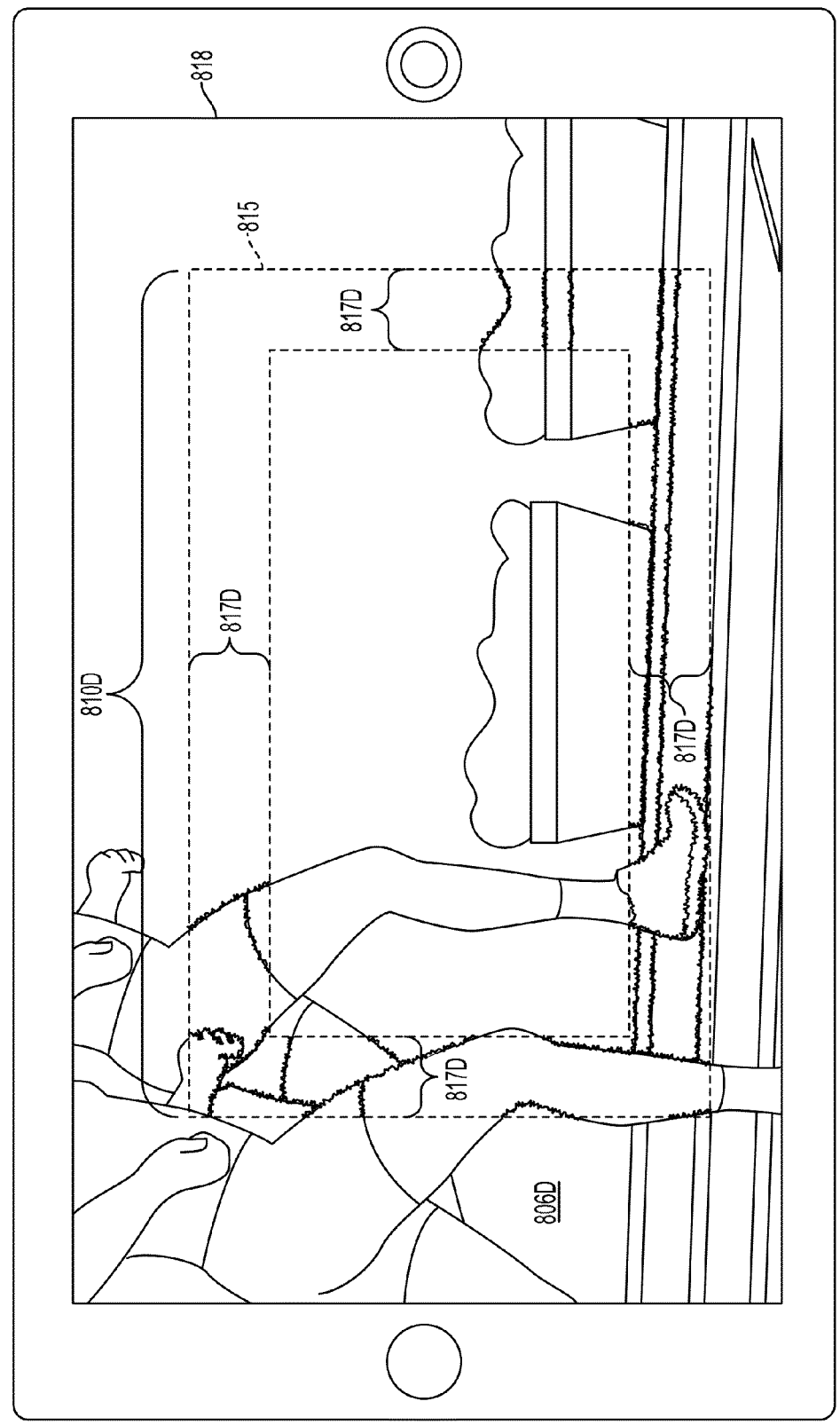
FIG. 8D illustrates a composite image frame representing a first image stream captured by a first camera and a second image stream captured by a second camera.

The transition between the live-view interface displaying the first image stream and displaying the second image stream is further illustrated in FIG. 8D. When compared to the composite image frame 816, the field of view of the composite image frame 818 is even narrower. As compared to the reduced image frame 810C and the expanded image frame 806C, the reduced image frame 810D makes up a larger proportion of the composite image frame 818 and the expanded image frame 806D makes up a smaller proportion of the composite image frame 818. Blurring techniques, such as those depicted in FIG. 7I, may be applied to the composite image frame 818 as shown at a blurred region 817D that lies within and near the stitching boundary 815.

Figure 8E:
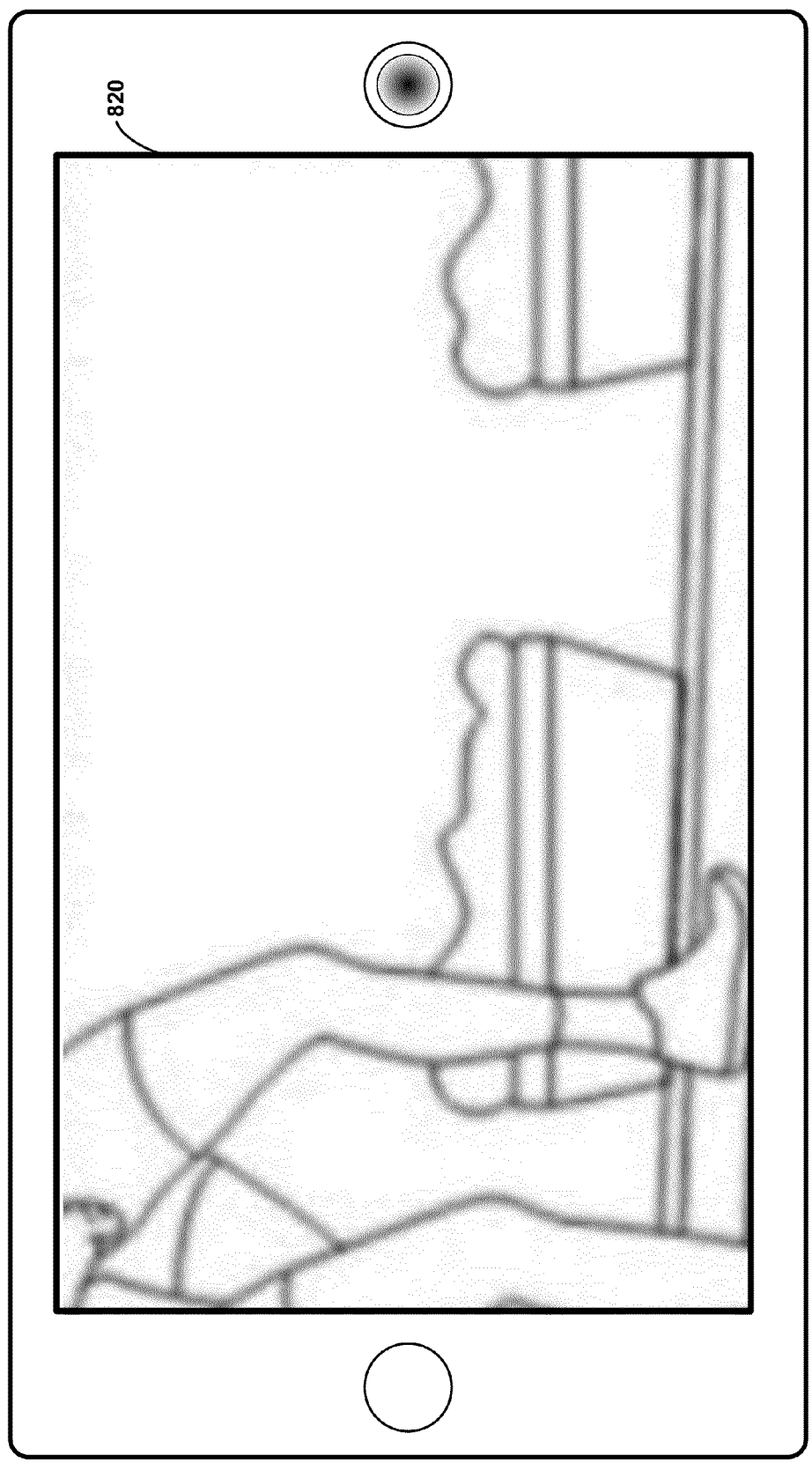
FIG. 8E illustrates a second image frame displayed by a live-view interface of a display of an imaging system.

As shown in FIG. 8E, the transition between the live-view interface displaying the first image stream and displaying the second image stream is complete. The live-view interface now displays the second image frame 820.

Note, that in FIGS. 8A-8E, a common instance of time is depicted in the composite image frames 812-820 for ease of illustration. However, in some examples the composite image frames 812-820 could respectively represent a real-time sequence of image frames that depict successive and distinct moments in time. Also, while FIGS. 8A-8E depict a sequence of image frames representing a "zoom-in" sequence, a "zoom-out" sequence could easily be performed by starting with display of the second image stream and reversing the sequence of the display.

Figure 9A:
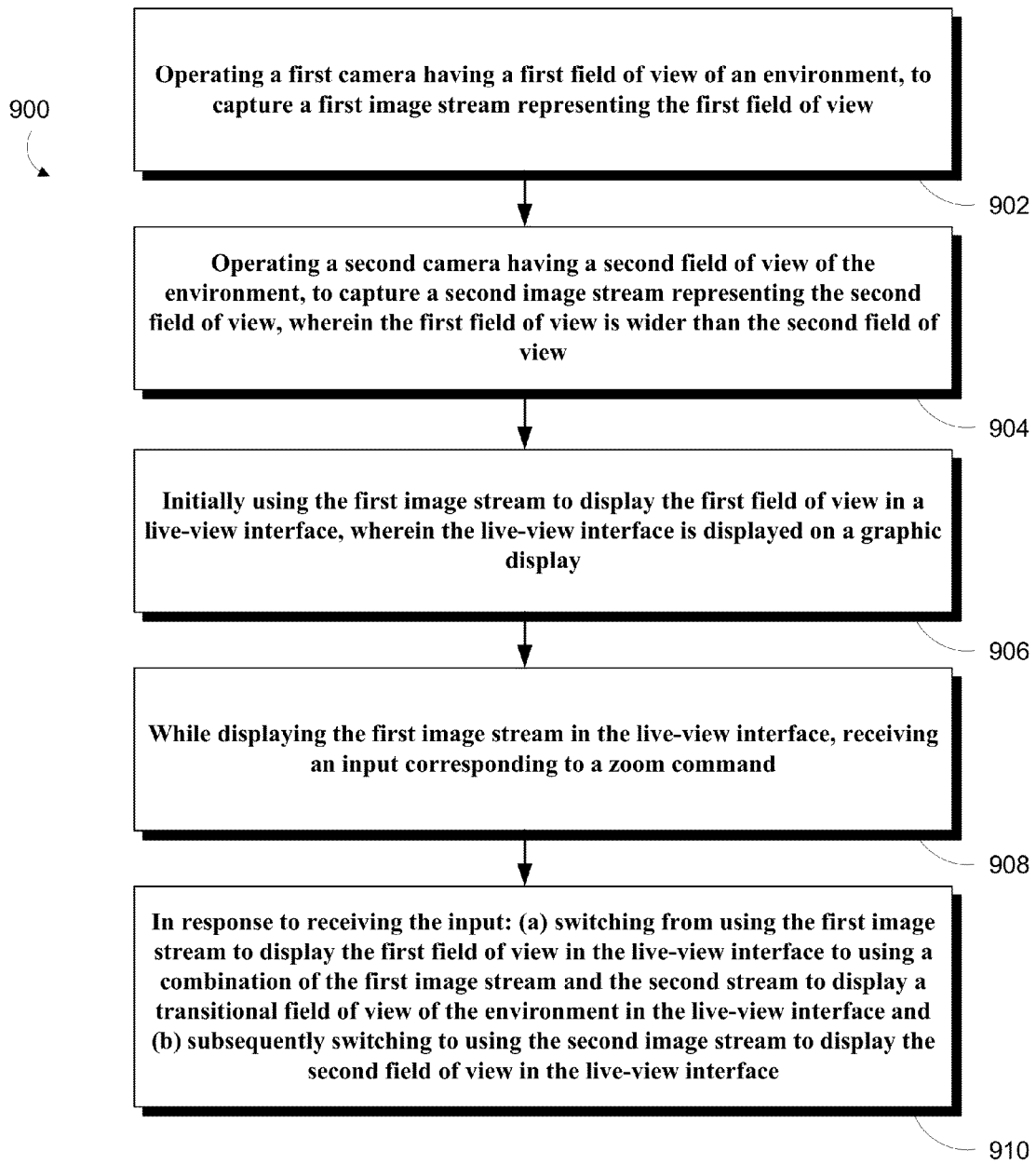
FIG. 9A is a block diagram depicting an example method.

FIG. 9A is a block diagram depicting an example method, in accordance with at least some embodiments described herein.

At block 902, the method 900 includes operating a first camera having a first field of view of an environment, to capture a first image stream representing the first field of view. For instance, any camera or imaging system of any of the preceding description could capture the first image stream.

At block 904, the method 900 includes operating a second camera having a second field of view of the environment, to capture a second image stream representing the second field of view. The first field of view is wider than the second field of view. By way of example, any camera or imaging system of any of the preceding description could capture the second image stream.

At block 906, the method 900 includes initially using the first image stream to display the first field of view in a live-view interface displayed on a graphic display. (See FIG. 8A, for example.)

At block 908, the method 900 includes, while displaying the first image stream in the live-view interface, receiving an input corresponding to a zoom command. The input could be received at a designated "zoom button" area of a touchscreen of the graphic display, for example. A zoom command could also be received using a slider bar interface in which a user touches and drags an indicator horizontally or vertically across the touchscreen a distance that indicates a given degree of zoom desired. In another example, a single tap or two taps in quick succession could represent a command to instantaneously or incrementally zoom from the first image stream to the second image stream (or vice versa). For example, one tap could indicate a 33% zoom, while another tap indicates another 33% zoom and so on. Or a tap and hold input could initiate a continuous zoom that is halted when the tap and hold input is released. A rate of zoom could be determined by prior user input as well. Inputs could also be received via mechanical buttons or via a voice command module and microphone listening for keywords or voice commands. Other examples are possible.

Figure 9B:
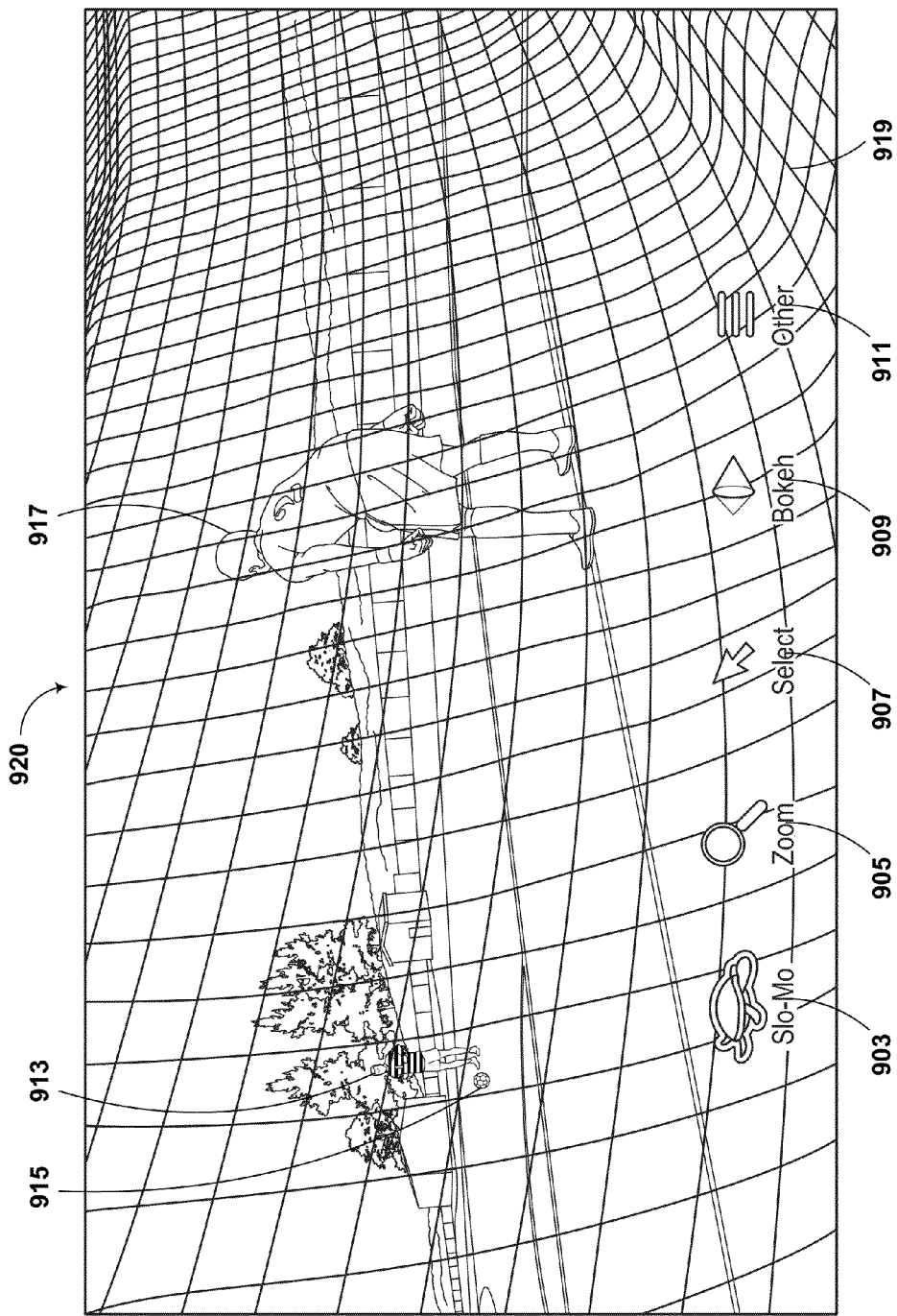
FIG. 9B illustrates a graphical user interface.

Generally, systems and methods disclosed here may include the application of various effects to a live view representation viewable from a display. FIG. 9B depicts a graphical user interface according to an illustrative embodiment. Scenario 920 could include a soccer player preparing to kick a ball toward a soccer goal and goalkeeper. Scenario 920 may also represent a live-view representation viewable by a user of the HMD or another display type. As such, the live view representation may include a user interface. The user interface may include icons, words, and/or other indicators (e.g. lights and/or sounds) that may be associated with effects applicable to the live view representation. For example, the icons may include a slow motion icon 903, a zoom icon 905, a select icon 907, a bokeh icon 909, and an other icon 911. The live view representation may further include a soccer player 913, a ball 915, a goalkeeper 917, and a net 919.

User interaction via the touch-based control interface may cause an effect to be selected. Such a selection may cause the corresponding icon to be highlighted, illuminated, underlined, enlarged, or otherwise identified. For example, the slow motion icon 903 may have a lighted outline as depicted in FIG. 9B.

Referring back to FIG. 9A, at block 910, the method 900 includes, in response to receiving the input: (a) switching from using the first image stream to display the first field of view in the live-view interface to using a combination of the first image stream and the second stream to display a transitional field of view of the environment in the live-view interface and (b) subsequently switching to using the second image stream to display the second field of view in the live-view interface. Displaying the transitional field of view may include displaying a sequence of composite image frames, wherein each successive frame of the sequence represents a narrower field of view than a previous frame in the sequence. For example, each image frame displayed in the sequence could represent an entirety of the second field of view and a portion of the first field of view that is narrower than a portion of the first field of view represented by a preceding image frame of the sequence. (See FIGS. 8A-8E, for example.)

Figure 10:
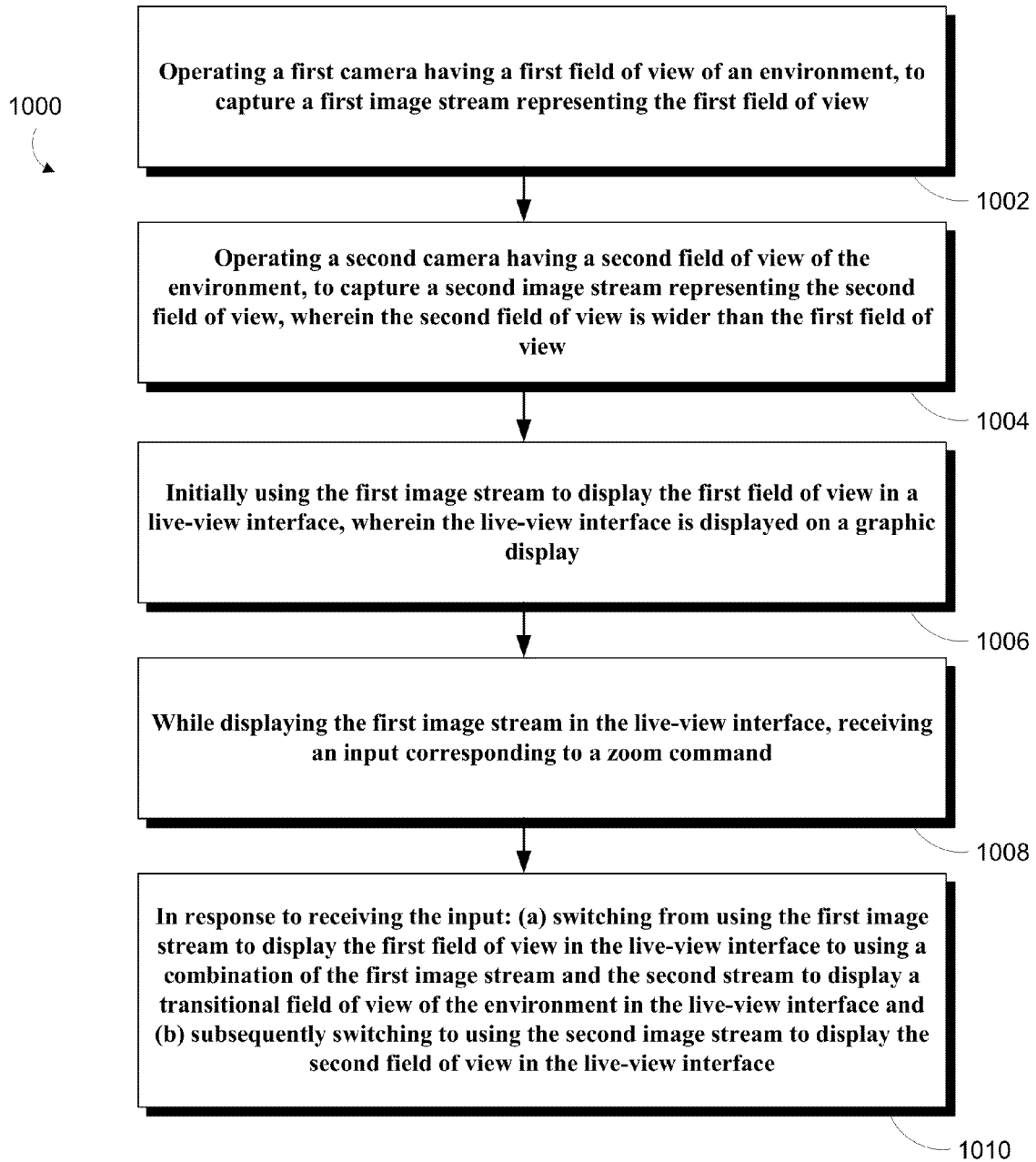
FIG. 10 is a block diagram depicting an example method.

FIG. 10 is a block diagram depicting an example method, in accordance with at least some embodiments described herein.

At block 1002, the method 1000 includes operating a first camera having a first field of view of an environment, to capture a first image stream representing the first field of view.

At block 1004, the method 1000 includes operating a second camera having a second field of view of the environment, to capture a second image stream representing the second field of view. The second field of view is wider than the first field of view.

At block 1006, the method 1000 includes initially using the first image stream to display the first field of view in a live-view interface. The live-view interface is displayed on a graphic display. (See FIG. 8E, for example.)

At block 1008, the method 1000 includes, while displaying the first image stream in the live-view interface, receiving an input corresponding to a zoom command.

At block 1010, the method 1000 includes in response to receiving the input, (a) switching from using the first image stream to display the first field of view in the live-view interface to using a combination of the first image stream and the second stream to display a transitional field of view of the environment in the live-view interface and (b) subsequently switching to using the second image stream to display the second field of view in the live-view interface. For example, each image frame displayed in the sequence could represent an entirety of the first field of view and a portion of the second field of view that is wider than a portion of the second field of view represented by a preceding image frame of the sequence. (See FIGS. 8A-8E in reverse order, for example.)

Figure 11:
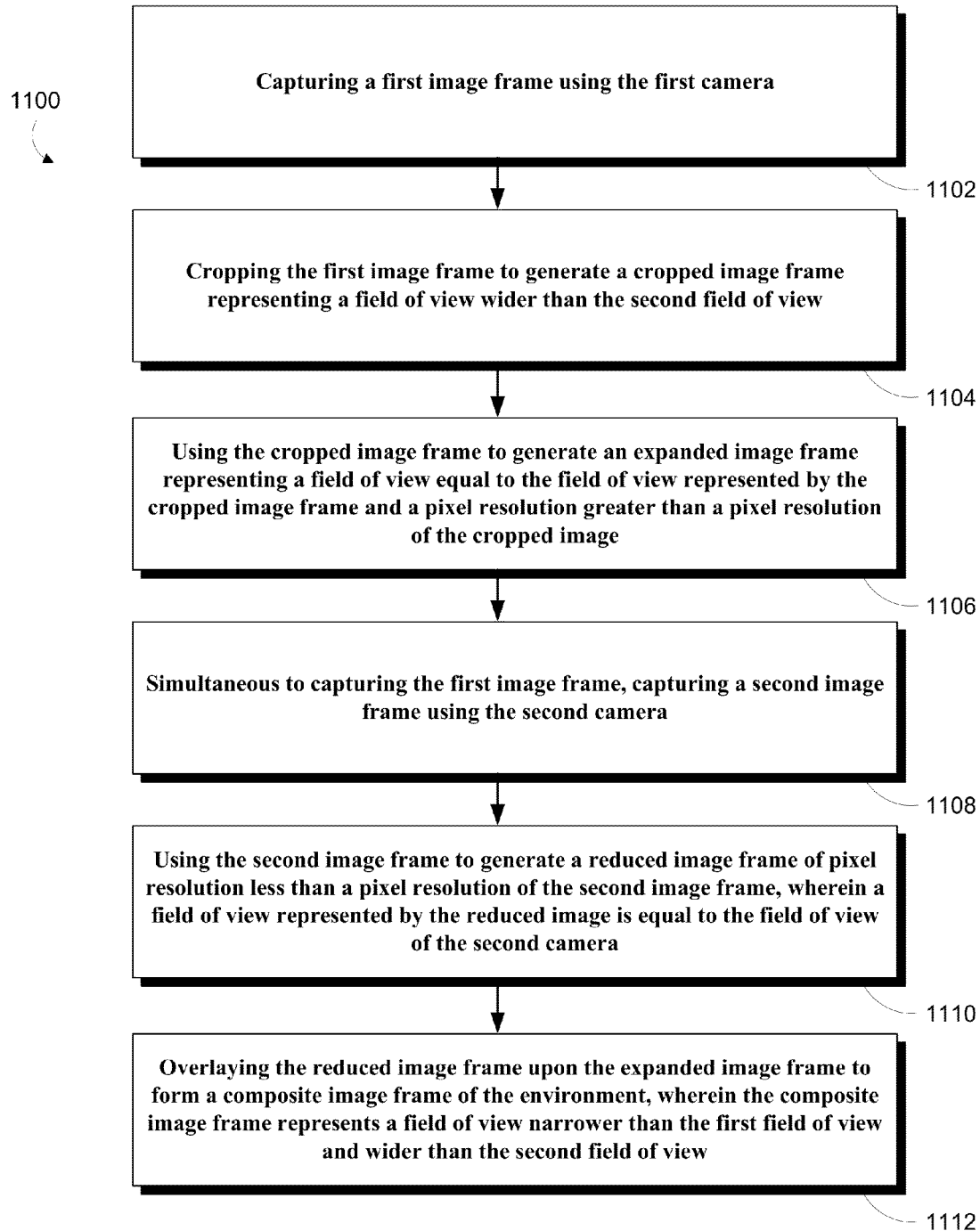
FIG. 11 is a block diagram depicting an example method.

FIG. 11 is a block diagram depicting an example method, in accordance with at least some embodiments described herein.

At block 1102, the method 1100 includes capturing a first image frame using the first camera. (See FIG. 7A, for example.)

At block 1104, the method 1100 includes cropping the first image frame to generate a cropped image frame representing a field of view wider than the second field of view. (See FIG. 7B, for example.)

At block 1106, the method 1100 includes using the cropped image frame to generate an expanded image frame representing a (i) field of view equal to the field of view represented by the cropped image frame and (ii) a pixel resolution greater than a pixel resolution of the cropped image frame. (See FIG. 7C, for example.)

At block 1108, the method 1100 includes simultaneous to capturing the first image frame, capturing a second image frame using the second camera. Respective pixel resolutions of the first and second image frames may be equal. (See FIG. 7D, for example.)

Capturing the first and second image frames may include disparity mitigation techniques that cause the first and second image frames to represent a common viewpoint, even if the first and second cameras that respectively capture the first and second image frames do not share an optical axis. For instance, a precursor image may be captured with the first camera. Various techniques may be used to determine a disparity between the captured precursor image frame and the second image frame. For instance, various known "depth-from-stereo" techniques may be used to determine disparity and/or extract depth information from the precursor image frame and the second image frame. Such techniques may utilize spatial optical flow between the precursor image frame and the second image frame to determine disparity information. Techniques that utilize feature matching to determine the disparity between the precursor image frame and the second image frame may also be utilized. Any of these techniques may be used to generate a first image frame that shares a viewpoint with the second image frame. Other techniques are also possible.

At block 1110, the method 1100 includes using the second image frame to generate a reduced image frame of pixel resolution less than a pixel resolution of the second image frame, wherein a field of view represented by the reduced image is equal to the field of view of the second camera. (See FIG. 7E, for example.)

At block 1112, the method 1100 includes overlaying the reduced image frame upon the expanded image frame to form a composite image frame of the environment. The composite image frame represents a field of view narrower than the first field of view and wider than the second field of view. In one example, the reduced image frame may be overlaid upon the expanded image frame such that a center of the reduced image frame is aligned with a center of the expanded image frame within the composite image frame. (See FIG. 7F, for example.)

V. CONCLUSION

In the figures, similar symbols typically identify similar components, unless context indicates otherwise. The illustrative embodiments described in the detailed description, figures, and claims are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block and/or communication may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

I claim:

1. A method comprising:
    operating a first camera having a first field of view of an environment, to capture a first image stream representing the first field of view;
    operating a second camera having a second field of view of the environment, to capture a second image stream representing the second field of view, wherein the first field of view is wider than the second field of view;
    initially using the first image stream to display the first field of view in a live-view interface, wherein the live-view interface is displayed on a graphic display;
    while displaying the first image stream in the live-view interface, receiving an input corresponding to a zoom command; and in response to receiving the input:
(a) switching from using the first image stream to display the first field of view in the live-view interface to using a combination of the first image stream and the second image stream to display a transitional field of view of the environment in the live-view interface; and
(b) subsequently switching to using the second image stream to display the second field of view in the live-view interface.

2. The method of claim 1, further comprising:
compressing an image of the first or second image stream to generate a compressed image frame; and
displaying the compressed image frame in the live-view interface.

3. The method of claim 1, further comprising, in the live-view interface, displaying image frames of the first or second image streams at a frame rate that is less than a frame capture rate of the first or second image streams.

4. The method of claim 1, wherein the transitional field of view is represented by an entire image frame of the second image stream and a portion of an image frame of the first image stream.

5. The method of claim 1, wherein using the combination of the first image stream and the second image stream to display the transitional field of view of the environment in the live-view interface comprises generating one or more composite image frames.

6. The method of claim 5, wherein the one or more composite image frames are generated by:
capturing a first image frame using the first camera;
cropping the first image frame to generate a cropped image frame representing a field of view wider than the second field of view;
using the cropped image frame to generate an expanded image frame representing (i) a field of view equal to the field of view represented by the cropped image frame and (ii) a pixel resolution greater than a pixel resolution of the cropped image frame;
simultaneous to capturing the first image frame, capturing a second image frame using the second camera;
using the second image frame to generate a reduced image frame of pixel resolution less than a pixel resolution of the second image frame, wherein a field of view represented by the reduced image is equal to the field of view of the second camera; and
overlaying the reduced image frame upon the expanded image frame to form a composite image frame of the environment, wherein the composite image frame represents a field of view narrower than the first field of view and wider than the second field of view.

7. The method of claim 6, wherein the reduced image frame is overlaid upon the expanded image frame such that a center of the reduced image frame is aligned with a center of the expanded image frame within the composite image frame.

8. The method of claim 6, wherein capturing the first image frame using the first camera comprises:
with the first camera, capturing a precursor image frame that represents a viewpoint that differs from a viewpoint of the second camera; and
altering the precursor image to generate the first image frame, wherein the first image frame represents a viewpoint of the second camera.

9. The method of claim 6, wherein the pixel resolution of the first image frame is equal to the pixel resolution of the second image frame.

10. The method of claim 6, further comprising calculating color values for pixels of the composite image frame by calculating a weighted average of color values of corresponding pixels of the reduced image frame and the expanded image frame.

11. The method of claim 6, further comprising generating brightness values for pixels of the composite image frame by calculating a weighted average of brightness values of corresponding pixels of the reduced image frame and the expanded image frame.

12. The method of claim 6, further comprising blurring pixels of the overlaid reduced image frame.

13. The method of claim 12, wherein blurring pixels of the overlaid reduced image frame comprises altering image sharpness of the overlaid reduced image frame to mitigate a sharpness discontinuity between the overlaid reduced image frame and the expanded image frame.

14. The method of claim 1, wherein the display of the transitional field of view of the environment in the live-view interface comprises a display of a sequence of image frames, wherein each successive frame of the sequence represents a narrower field of view than a previous frame in the sequence.

15. The method of claim 14, wherein each image frame of the sequence represents an entirety of the second field of view and a portion of the first field of view that is narrower than a portion of the first field of view represented by a preceding image frame of the sequence.

16. A non-transitory computer readable medium storing instructions that, when executed by a computing device, cause the computing device to perform functions comprising:
operating a first camera having a first field of view of an environment, to capture a first image stream representing the first field of view;
operating a second camera having a second field of view of the environment, to capture a second image stream representing the second field of view, wherein the first field of view is wider than the second field of view;
initially using the first image stream to display the first field of view in a live-view interface, wherein the live-view interface is displayed on a graphic display;
while displaying the first image stream in the live-view interface, receiving an input corresponding to a zoom command; and
in response to receiving the input:
(a) switching from using the first image stream to display the first field of view in the live-view interface to using a combination of the first image stream and the second image stream to display a transitional field of view of the environment in the live-view interface; and
(b) subsequently switching to using the second image stream to display the second field of view in the live-view interface.

17. A system comprising:
a processor; and
a non-transitory computer readable medium storing instructions that, when executed by the processor, cause the system to perform functions comprising:
operating a first camera having a first field of view of an environment, to capture a first image stream representing the first field of view;
operating a second camera having a second field of view of the environment, to capture a second image stream representing the second field of view, wherein the first field of view is wider than the second field of view;

initially using the first image stream to display the first field of view in a live-view interface, wherein the live-view interface is displayed on a graphic display;

while displaying the first image stream in the live-view interface, receiving an input corresponding to a zoom command; and in response to receiving the input:
- (a) switching from using the first image stream to display the first field of view in the live-view interface to using a combination of the first image stream and the second image stream to display a transitional field of view of the environment in the live-view interface; and
- (b) subsequently switching to using the second image stream to display the second field of view in the live-view interface.

18. A method comprising:

operating a first camera having a first field of view of an environment, to capture a first image stream representing the first field of view;

operating a second camera having a second field of view of the environment, to capture a second image stream representing the second field of view, wherein the second field of view is wider than the first field of view;

initially using the first image stream to display the first field of view in a live-view interface, wherein the live-view interface is displayed on a graphic display;

while displaying the first image stream in the live-view interface, receiving an input corresponding to a zoom command; and in response to receiving the input:
- (a) switching from using the first image stream to display the first field of view in the live-view interface to using a combination of the first image stream and the second image stream to display a transitional field of view of the environment in the live-view interface; and
- (b) subsequently switching to using the second image stream to display the second field of view in the live-view interface.

19. A mobile device comprising:

a first camera arranged on a surface of the mobile device and having a first field of view;

a second camera arranged on the surface of the mobile device and having a second field of view, wherein the first field of view is wider than the second field of view, and wherein an optical axis of the second camera is substantially parallel to an optical axis of the first camera;

a graphic display; and a control system that is operable to:
- operate the first camera to capture a first image stream;
- operate the second camera to capture a second image stream;
- use the first image stream to display an image stream of the first field of view in a live-view interface, wherein the live-view interface is displayed on the graphic display;
- while displaying the image stream of the first field of view in the live-view interface, receive an input corresponding to a zoom command; and
- in response to receiving the zoom command, switch to use of the second image stream to display an image stream of the second field of view in the live-view interface.

20. The mobile device of claim 19, wherein the control system is further operable to, in response to receiving the zoom command, and before switching to use of the second image stream to display the image stream of the second field of view in the live-view interface:

switch from displaying the image stream of the first field of view in the live-view interface to use of a combination of the first image stream and the second image stream to display an image stream of a transitional field of view of the environment in the live-view interface.

* * * * *